United States Patent
Stewart et al.

(10) Patent No.: US 11,741,492 B1
(45) Date of Patent: *Aug. 29, 2023

(54) WORKFLOW MANAGEMENT SYSTEM FOR TRACKING EVENT OBJECTS ASSOCIATED WITH ENTITIES AND SECONDARY ENTITIES

(71) Applicant: Share Edge, LLC, La Canada, CA (US)

(72) Inventors: Benjamin C. Stewart, Manhattan Beach, CA (US); Thomas E. Larkin, III, Newport Beach, CA (US)

(73) Assignee: SHARE EDGE, LLC, La Canada (CA)

( * ) Notice: Subject to any disclaimer, the term of this patent is extended or adjusted under 35 U.S.C. 154(b) by 188 days.

This patent is subject to a terminal disclaimer.

(21) Appl. No.: 17/179,856

(22) Filed: Feb. 19, 2021

Related U.S. Application Data

(63) Continuation of application No. 15/367,079, filed on Dec. 1, 2016, now Pat. No. 10,963,903, which is a
(Continued)

(51) Int. Cl.
*G06Q 30/00* (2023.01)
*G06Q 30/0234* (2023.01)
(Continued)

(52) U.S. Cl.
CPC ..... *G06Q 30/0234* (2013.01); *G06Q 30/0214* (2013.01); *G06Q 30/0236* (2013.01); *G06F 16/24554* (2019.01)

(58) Field of Classification Search
CPC ........... G06Q 30/0234; G06Q 30/0214; G06Q 30/0236; G06Q 30/0207–0277; G06F 16/24554
See application file for complete search history.

(56) References Cited

U.S. PATENT DOCUMENTS

| 6,167,435 A | 12/2000 | Druckenmiller |
| 6,609,104 B1 | 8/2003 | Deaton et al. |

(Continued)

FOREIGN PATENT DOCUMENTS

| CA | 2 785 383 A1 | 2/2013 |
| JP | 2008-192144 | 8/2008 |

(Continued)

OTHER PUBLICATIONS

A. Metwally, D. Agrawal, A. El Abbad and Q. Zheng, "On Hit Inflation Techniques and Detection in Streams of Web Advertising Networks," 27th International Conference on Distributed Computing Systems (ICDCS '07), Toronto, ON, Canada, 2007, pp. 52-52, doi: 10.1109/ICDCS.2007.124. (Year: 2007).*

(Continued)

*Primary Examiner* — Sun M Li
(74) *Attorney, Agent, or Firm* — Knobbe, Martens, Olson & Bear LLP

(57) ABSTRACT

A workflow management system enables an entity to store information components in one or more publicly accessible databases, the information components associated with an acquisition by the acquisition entity. A unique entity identifier is associated with the information components in the databases, such that when reviewing entities access the information component via the databases and perform a similar event, a similar event object with the unique entity identifier is transmitted to the workflow management system. The information components may also be distributed by secondary entities, which may be automatically selected by the workflow management system based on historical data associated with respective secondary entities. When event objects initiated by information components stored by a secondary entity are received at the workflow management system, some or all of a maximum value increment associ- (Continued)

ated with the acquisition is partitioned between the secondary entity and the acquisition entity.

7 Claims, 25 Drawing Sheets

Related U.S. Application Data continuation of application No. 14/989,304, filed on Jan. 6, 2016, now abandoned, said application No. 15/367,079 is a continuation-in-part of application No. 13/927,022, filed on Jun. 25, 2013, now Pat. No. 10,475,059.

(60) Provisional application No. 62/126,205, filed on Feb. 27, 2015, provisional application No. 62/101,811, filed on Jan. 9, 2015, provisional application No. 61/702,635, filed on Sep. 18, 2012, provisional application No. 61/668,384, filed on Jul. 5, 2012.

(51) Int. Cl.
G06Q 30/0214 (2023.01)
G06Q 30/0207 (2023.01)
G06F 16/2455 (2019.01)

(56) References Cited

U.S. PATENT DOCUMENTS

| | | | |
|---|---|---|---|
| 7,398,246 | B2 | 7/2008 | Doynow |
| 7,676,396 | B1 | 3/2010 | White |
| 8,407,062 | B2 | 3/2013 | Jermyn et al. |
| 8,522,330 | B2 | 8/2013 | Shuster et al. |
| 10,475,059 | B2 | 11/2019 | Stewart et al. |
| 10,963,903 | B1 | 3/2021 | Stewart et al. |
| 11,604,639 | B2 | 3/2023 | Stewart et al. |
| 2003/0220863 | A1 | 11/2003 | Holm et al. |
| 2004/0103426 | A1 | 5/2004 | Ludvig et al. |
| 2005/0015482 | A1 | 1/2005 | Blankenship |
| 2005/0044139 | A1 | 2/2005 | Christian et al. |
| 2006/0026032 | A1 | 2/2006 | Higgins et al. |
| 2007/0106608 | A1 | 5/2007 | Khandelwal |
| 2007/0121843 | A1 | 5/2007 | Atazky et al. |
| 2007/0179853 | A1* | 8/2007 | Feige .............. G06Q 30/00 705/14.27 |
| 2007/0255702 | A1 | 11/2007 | Orme |
| 2008/0071775 | A1* | 3/2008 | Gross .............. G06F 16/951 707/999.005 |
| 2009/0259538 | A1 | 10/2009 | Miller et al. |
| 2009/0271289 | A1 | 10/2009 | Klinger et al. |
| 2010/0042487 | A1* | 2/2010 | Barazani ............ G06Q 30/02 709/224 |
| 2010/0057530 | A1 | 3/2010 | Parivash et al. |
| 2011/0106597 | A1 | 5/2011 | Ferdman et al. |
| 2011/0125569 | A1 | 5/2011 | Yoshimura et al. |
| 2011/0246265 | A1 | 10/2011 | Gardenswartz |
| 2011/0320250 | A1 | 12/2011 | Gemmell et al. |
| 2012/0130788 | A1 | 5/2012 | Winslade et al. |
| 2012/0143674 | A1 | 6/2012 | Ziskrout et al. |
| 2012/0150598 | A1 | 6/2012 | Griggs |
| 2012/0158477 | A1 | 6/2012 | Tennenholtz et al. |
| 2012/0209675 | A1* | 8/2012 | Tyler .............. G06Q 30/0214 705/14.16 |
| 2012/0215615 | A1 | 8/2012 | Moredock |
| 2012/0221387 | A1 | 8/2012 | Liu et al. |
| 2012/0290938 | A1 | 11/2012 | Subbarao et al. |
| 2013/0066695 | A1 | 3/2013 | Just |
| 2013/0159089 | A1 | 6/2013 | Gil et al. |
| 2013/0226710 | A1 | 8/2013 | Plut |
| 2013/0231974 | A1 | 9/2013 | Harris et al. |
| 2013/0311359 | A1* | 11/2013 | Zinger ............. G06F 16/972 715/760 |
| 2014/0012645 | A1 | 1/2014 | Stewart et al. |
| 2014/0012654 | A1 | 1/2014 | Stewart et al. |
| 2014/0039990 | A1 | 2/2014 | Georgi |
| 2014/0106704 | A1 | 4/2014 | Cooke et al. |
| 2015/0039413 | A1 | 2/2015 | Winkler |
| 2015/0112774 | A1 | 4/2015 | Georgoff et al. |
| 2017/0154347 | A1 | 6/2017 | Bateman |
| 2017/0220333 | A1 | 8/2017 | Higginson |
| 2018/0129546 | A1 | 5/2018 | Mullins et al. |
| 2018/0275966 | A1 | 9/2018 | Linton et al. |
| 2019/0102078 | A1 | 4/2019 | Bhatt et al. |
| 2019/0347082 | A1 | 11/2019 | Gurtin et al. |
| 2020/0111115 | A1 | 4/2020 | Stewart et al. |
| 2021/0263726 | A1 | 8/2021 | Stewart |
| 2022/0171615 | A1 | 6/2022 | Stewart |

FOREIGN PATENT DOCUMENTS

| | | |
|---|---|---|
| KR | 10-2004-0072017 | 8/2004 |
| KR | 10-0728937 | 6/2007 |
| WO | WO 01/77856 A1 | 10/2001 |
| WO | WO 02-29605 A2 | 4/2002 |
| WO | WO 2012/125852 A2 | 9/2012 |
| WO | WO 2013/130735 A1 | 9/2013 |
| WO | WO 2021/167789 A1 | 8/2021 |

OTHER PUBLICATIONS

M. Kantardzic, C. Walgampaya, B. Wenerstrom, 0. Lozitskiy, S. Higgins and D. King, "Improving Click Fraud Detection by Real Time Data Fusion," 2008 IEEE International Symo Signal Processing and Information Technology, Sarajevo, Bosnia and Herzegovina, 2008, pp. 69-74, doi: 10.1109/ISSPIT.2008.4 (Year: 2008).*

R. v. Zwol, L. G. Pueyo, M. Muralidharan and B. Sigurbjornsson, "Ranking Entity Facets Based on User Click Feedback," 2010 IEEE Fourth International Conference on Semantic Computing, Pittsburgh, PA, USA, 2010, pp. 192-199, doi: 10.1109/ICSC.2010.33. (Year: 2010).*

U. Irmak, V. von Brzeski and R. Kraft, "Contextual Ranking of Keywords Using Click Data," 2009 IEEE 25th International Conference on Data Engineering, Shanghai, China, 2009, pp. 457-468, doi: 10.1109/ICDE.2009.76. (Year: 2009).*

International Search Report; International Application No. PCT/US2013/047702, filed on Jun. 25, 2013 (dated Oct. 14, 2013).

International Search Report and Written Opinion; International Application No. PCT/US2021/016355, filed on Feb. 3, 2021 (dated Apr. 5, 2021).

Cheng, Etsy users irked after buyers, purchases exposed to the world, Ars Technica [online], retrieved from https://arstechnica.com/information-technolgy/2011/03/etsy-users-irked-after-buyers-purchases-exposed-to-the-world/on Dec. 23, 2022, and dated Mar. 14, 2022 (Year: 2011).

Daukseviciut et al., "Loyalty Programmes for Small and Medium Enterprises Applied by the World's Safest Banks", Intelektine Ekonomika; Vilnius Iss. 4, 2011.

Mr. Rebates, from the Wayback Machine, downloaded Nov. 12, 2021 from https://web.archive.org/web/20111201035858/htt://www.mrrebates.com: 80/Default.asp and dated Dec. 1, 2011.

International Preliminary Report on Patentability and Written Opinion in PCT/US2021/016355, dated Aug. 23, 2022.

* cited by examiner

| Acuisition Entity/Secondary Entity | Vendor | Status | Total Clicks Ratio | Gross Click Purity | Total Incentive | Click Value | Rebate Amount | Earnings | Remaining Rebate |
|---|---|---|---|---|---|---|---|---|---|
| cust1@example.com | tom@furniture.com | Paid | 9 / 5 | 55.56% | 10.89 | 6.53 | 43.58 | 43.58 | 0 |
| cust2@gmail.com | tom@furniture.com | Active | 22 / 6 | 27.27% | 3.96 | 7.89 | 63.13 | 51.30 | 11.83 |
| cust3@hotmail.com | tom@furniture.com | Active | 4 / 0 | 0.0% | 3.65 | 2.92 | 14.59 | 3.65 | 10.94 |
| cust4@yahoo.com | tom@furniture.com | Active | 150 / 3 | 0.2% | 2.28 | 4.59 | 22.94 | 16.05 | 6.89 |

FIG. 18

EXAMPLE SECONDARY DISTRIBUTOR (E.G., SECONDARY ENTITY) CRITERIA

GROSS CLICKS

GROSS CLICK PURITY

COST PER SHARE (INCENTIVE)

COST PER CLICK (CLICK VALUE)

EXISTING REBATES OUTSTANDING

PURCHASE CONVERSIONS

GEOGRAPHIC LOCATION (E.G., IP ADDRESS)

DEMOGRAPHIC CHARACTERISTICS

FIG. 20

EXAMPLE SYNDICATION OFFER
(PARTITION/ALLOCATION)
CRITERIA

CLICK VALUE OF REBATE TO BE
DISTRIBUTED

INPUT FROM VENDOR,
ACQUISITION ENTITY, AND/OR
SECONDARY ENTITY

REMAINING VALUE OF REBATE
TO BE DISTRIBUTED

SECONDARY ENTITY AVERAGE
COST PER SHARE (INCENTIVE)

SECONDARY ENTITY AVERAGE
COST PER CLICK (CLICK VALUE)

FEE TO WORKFLOW
MANAGEMENT SYSTEM

FIG. 21 http://www.example.com/

Data Analytics

My Account
- Manage Advertiser Profile
- Update Account Info

My Stores
- Add New Store
- Manage My Stores

My Social Rebates
- Create a Social Rebate
- Active Social Rebates
- Paused Social Rebates
- Completed Social Rebates Rebates Claimed: 499
Total Committed: $1867.68
Total Earned: $974.77

| Date | Sharer | Total Clicks | Click Purity | Total Rebate | Total Earned |
|---|---|---|---|---|---|
| 6/15/2013 | clark@gmail.com | 0 | N/A | $2.40 | $0.00 |
| 6/15/2013 | ken@yahoo.com | 1 | 0% | $2.40 | $0.60 |
| 6/16/2013 | dan@gmail.com | 6 | 33.33% | $2.40 | $1.32 |
| 6/17/2013 | jeff@hotmail.com | 21 | 19.05% | $8.70 | $6.96 |
| 6/17/2013 | howie@gmail.com | 2 | 0% | $2.40 | $0.60 |
| 6/18/2013 | dave@mail.net | 7 | 14.29% | $2.40 | $0.96 |
| 6/18/2013 | max@msu.edu | 5 | 80% | $5.40 | $4.59 |
| 6/19/2013 | peter@comcast.net | 12 | 66.67% | $2.40 | $2.40 |
| 6/19/2013 | donnie@gmail.com | 4 | 50% | $2.40 | $1.32 |
| 6/20/2013 | wesley@comcast.net | 9 | 44.44% | $2.40 | $2.04 |

FIG. 26

WORKFLOW MANAGEMENT SYSTEM FOR TRACKING EVENT OBJECTS ASSOCIATED WITH ENTITIES AND SECONDARY ENTITIES

BACKGROUND

Tracking of event objects, such as associated with behavior or interactions of entities in response to information stored on various publicly accessible databases is a non-trivial task.

SUMMARY

A workflow management system enables an acquisition entity to store information components in one or more publicly accessible databases, the information components associated with an acquisition by the entity. A unique entity identifier is associated with the information components in the databases, such that when reviewing entities access the information component via the databases and perform an event associated with the information components, such as accessing, reading, and/or otherwise interacting with the information components, a similar event object with the unique entity identifier is transmitted to the workflow management system. The information components may also be distributed by secondary entities, which may be automatically selected by the workflow management system based on historical data associated with respective secondary entities. When events associated with information components stored by a secondary entity performed and indicated to the workflow management system, some or all of a maximum value increment associated with the acquisition is partitioned between the secondary entity and the acquisition entity.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Entity: an individual, group of individuals, business, other entity, and/or combination of the aforementioned.

Acquisition Entity: an entity that acquires a product from a vendor. An acquisition entity may then store (or cause storage of) information components associated with the product on one or more network accessible databases (or in some embodiments an acquisition entity does not store information components associated with the product). Such information components are associated with a unique entity identifier.

Secondary Entity: an entity that stores information components on a network accessible database on behalf of an acquisition entity. Such information components are associated with a unique secondary entity identifier and/or a unique entity identifier (of the acquisition entity). A secondary entity may also be referred to herein as, and is synonymous with, a "distributor."

Reviewing Entity: an entity that accesses (e.g., views on a network accessible database) information components, either associated with an acquisition entity identifier and/or a secondary entity identifier.

Information Components: data regarding a particular event or object associated with the particular event. For example, information components may include information regarding a physical object that was acquired by the acquisition entity and information indicating how reviewing entities may also obtain the same or similar physical object, such as from a same vendor as the acquisition entity. The information components may include "promotional materials" as discuss elsewhere herein. A physical object may be referred to herein as a product. Each of these terms (physical object and product) are used for ease of description and should be interpreted to include other "non-physical objects", such as services, online objects, or any items (whether tangible or intangible) that may be acquired by an entity.

Network accessible databases: Any online data stores having information from a plurality of different entities that provides selective access to the information based on access restrictions determined by the acquisition entity (and/or other entity), for example. Such online data stores may include social media networks wherein entities store information that is accessible to certain other entities with a particular relationship with the entity (e.g., other individuals within a certain level of connections with the entity). References herein to "databases" may refer to any type of data structure for storing and/or organizing data, including, but not limited to, relational databases (for example, Oracle database, mySQL database, and the like), spreadsheets, XML files, and text files, among others. The various terms "database," "data store," and "data source" may be used interchangeably in the present disclosure.

Event object: an indicator of a particular event performed by an entity. For example, an event object may indicate that information components associated with a particular unique identifier (e.g., associated with a secondary and/or acquisition entity) has been accessed and/or interacted with in a particular manner. In another example, an event object may indicate that a particular product was purchased by an entity (e.g., a reviewing entity), and may include or be associated with an identifier of an acquisition entity (and/or secondary entity) that stored information components regarding the particular event.

Workflow management system: a computing system that tracks events of entities, such as acquisition entities, secondary entities, and/or reviewing entities. For example, a workflow management system may provide an acquisition entity with information components (include the unique acquisition entity identifier) for storage on one or more network accessible databases. The workflow management system then receives event objects (or activity identifiers) indicating when a reviewing entity has performed a qualifying action in response to the information components. A qualifying action, for example, may include accessing and/or interacting with information components in a particular manner, and/or acquisition of a physical object similar to (or the same as, or from a same provider) a physical object acquired by the acquisition entity and indicated in the information components.

Secondary Entity Selection Model: A model, algorithm, or ruleset, that is executed by the workflow management system (and/or other computer system) to identify one or more secondary entities to associate with a particular product acquisition of an acquisition entity. Invitations to become secondary entities for a particular product acquisition of an entity may be automatically transmitted to one or more potential secondary entities identified by the selection model and, if the secondary entities accept the invitation, they may then store information components including a unique identifier of the secondary entity on one or more network accessible databases. A secondary entity selection model may be based on various combinations of entity parameters.

For example, potential secondary entities may be required to have acquired one or more products (and in some cases the same or similar product as was acquired by the acquisition entity) from a same vendor (e.g., an online vendor, vendor, or other provider of products) as the acquisition entity. The potential secondary entities may further be limited by the secondary entity selection model based on various other parameters, such as gross number of clicks on information components (e.g., promotional material shared by the potential secondary entity in connection with a previous product acquisition from a same vendor), a ratio of a number of legitimate clicks and the gross number of clicks, the legitimate clicks comprising clicks considered legitimate and associated with previously shared information components by the potential secondary entity, a compensation (or payment) incentive associated with previously shared information components by the potential secondary entity, a cost per click associated with previously shared information components by the potential secondary entity, a total amount of compensation (e.g. rebate portions) outstanding associated with the potential secondary entity, and/or various other parameters discussed herein.

Social networking is a major network accessible database used for communications today. Individuals are able to broadcast messages to relatives, friends, acquaintances and the world through technologies such as the internet and mobile devices. Because of the rapid speed of communications offered by these technologies, individuals are able to reach an audience much larger than that reachable by traditional communications means.

Those offering products and services may wish to take advantage of the communication possibilities opened up by social networking. As a general matter, entities such as vendors (e.g., merchants, retailers, or others that sell or trade products, either online, via brick and mortar establishments, or otherwise) may wish to reach wide audiences by transmitting promotional materials using computer network systems. Often it is advantageous to have promotional materials originate, or appear to originate, from entities that are trusted by the viewers of the promotional materials. For example, a person viewing a message relating to a product is more likely to be interested in the message (as indicated, for example, by clicking on a link in the message, or purchasing a product based on the message) if the message originates from a friend or acquaintance of the viewer. Furthermore, that viewer may also be more likely to be interested in the message about the product if the originator has more of a direct connection with the product (for example, the originator has purchased or tested the product). Thus, it may be advantageous to create an appropriate environment so that such originators of product messages can be discovered and given incentives to spread effective messages. Some or all of these considerations motivate the various aspects and embodiments as disclosed herein. Accordingly, presented herein are systems and methods that enable product (or service) purchasers (e.g., acquisition entities), to share promotional materials (e.g., information components) via social networks (and/or other network accessible databases) and may further enable the purchasers to receive rewards, such as rebates, in response to interactions with the promotional materials by others (e.g., reviewing entities, such as friends of the purchaser). In various embodiments, the promotional materials shared by the purchaser relates to the product purchased, which may lend greater credibility and/or interest in the promotional material being shared.

Additionally disclosed are systems and methods of syndication of such promotional materials to secondary distributors (also referred to herein as "third-party distributors") and revenue sharing of resulting rewards. For example, a purchaser who is offered a reward for sharing information components may opt to allow secondary entities to share those information components also, a desirable option if the acquisition entity lacks the desire and/or ability to sufficiently distribute those information components. One or more secondary entities may then receive some or all of the associated reward (e.g., the purchase rebate) in exchange.

In one embodiment, a method for utilizing one or more secondary entities for posting of information components related to a product is disclosed. In this embodiment, the method is performed by a workflow management system having one or more computer processors. The computer system associates an account of an acquisition entity of a product with purchase data, wherein the product was purchased from a vendor and qualifies for a rebate of up to a maximum rebate amount that is conditionally payable to the acquisition entity and/or one or more secondary entities. In some embodiments, the purchase data includes an amount paid by an acquisition entity for the product. The computer system identifies the one or more secondary entities based on a secondary entity selection model, such as by determining a set of previous acquisition entities that previously purchased a product from the vendor; determining a first subset of previous acquisition entities selected from the set of previous acquisition entities, the first subset including previous acquisition entities that previously claimed a rebate; evaluating each of the previous acquisition entities of the first subset of previous acquisition entities according to one or more distributor criteria (e.g., such as may be part of the secondary entity selection model); and based on the evaluation, designating one or more of the previous acquisition entities of the first subset of previous acquisition entities as the one or more secondary entities.

In one embodiment, the workflow management system determines a click value corresponding to a monetary value to be paid in response to each of a predetermined quantity of respective clicks on first promotional material by respective viewers, the first information components shared by the acquisition entity in connection with the rebate. In addition, a syndication allocation (e.g., a partitioning of a maximum rebate) is determined that indicates a first portion of the click value to be paid to the acquisition entity and a second portion of the click value to be paid to respective secondary entities in response to respective clicks on second information components by respective viewers, the second information components shared by the respective secondary entities in connection with the rebate.

The computer system transmits an invitation to the one or more secondary entities. In response a received indication of acceptance of the invitation from a first of the secondary entities, the first secondary entity becomes a first secondary entity of the second information components and is eligible to receive at least portions of the second portion of the click values.

After the computer system receives indications that a viewer has clicked on second information components posted using one or more social networking accounts of the first secondary entity, the computer system, in response to determining that the maximum rebate amount has not been reached and based at least in part upon the syndication sharing percentage, credits the account of the acquisition entity the first portion of the click value, and credits an account of the first secondary entity the second portion of the click value.

In some embodiments, the secondary entity selection model (which may include one or more distributor criteria such as the following) comprises at least one of: a gross number of clicks on information components shared by the previous acquisition entity (e.g., a potential secondary entity) in connection with a previously claimed rebate on a previously purchased product from the vendor, a ratio of a number of legitimate clicks and the gross number of clicks, the legitimate clicks comprising clicks considered legitimate and associated with previously shared information components by the previous acquisition entity in connection with the previously claimed rebate on the previous purchased product from the vendor, a payment incentive associated with previously shared information components by the previous acquisition entity in connection with the previously claimed rebate on the previous purchased product from the vendor, a cost per click associated with previously shared information components by the previous acquisition entity in connection with the previously claimed rebate on the previous purchased product from the vendor, and a total amount of rebates outstanding associated with the previous acquisition entity.

In one embodiment, the gross number of clicks is based at least in part upon a total number of clicks on information components shared by the previous acquisition entity in connection with the previously claimed rebate.

In one embodiment, identifying the one or more secondary entities further includes determining the number of legitimate clicks based at least in part upon one or more of: a timing of the click, an address from which the click originated, or a relation between the click and one or more other clicks.

In one embodiment, the payment incentive indicates a monetary value at which the previous acquisition entity is willing to share information components, based at least in part upon a monetary value paid to the previous acquisition entity in response to the previous acquisition entity sharing information components associated with the previously claimed rebate.

In one embodiment, the cost per click indicates a monetary value at which the previous acquisition entity is willing to share information components, based at least in part upon a monetary value paid to the previous acquisition entity in response to a click on shared information components associated with the previously claimed rebate.

In one embodiment, the total amount of rebates outstanding is based at least in part upon a monetary value yet to be paid to the previous acquisition entity in connection with the previously claimed rebates.

In one embodiment, evaluating each of the previous acquisition entities according to one or more distributor criteria comprises calculating a weighted sum using the one or more distributor criteria.

In one embodiment, the syndication allocation is calculated based at least in part upon one or more syndication offer criteria, the one or more syndication offer criteria comprising at least one of: the click value, a remaining value indicating a portion of the maximum rebate amount not yet paid to the acquisition entity or respective secondary entities, a payment incentive associated with a secondary entities of the respective secondary entities, a cost per click associated with a secondary entities of the respective secondary entities, one or more inputs received from the vendor, the acquisition entity, or the respective secondary entities, and a fee to be paid to a promotion manager or workflow management system.

In one embodiment, a computing system comprises one or more computer storage devices configured to store software instructions, one or more computer processors configured to execute the software instructions stored on the computer storage devices. The system includes an account module comprising instructions stored on the computer storage media, the account module being configured to associate an account of an acquisition entity of a product with purchase data, wherein the product was purchased from a vendor, and qualifies for a rebate of up to a maximum rebate amount that is conditionally payable to the acquisition entity and one or more secondary entities. In some embodiments, the purchase data includes an amount paid by the acquisition entity for the product. The account module further identifies the one or more secondary entities by determining a set of previous acquisition entities that previously purchased a product from the vendor; determining a first subset of previous acquisition entities selected from the set of previous acquisition entities, the first subset including previous acquisition entities that previously claimed a rebate; evaluating each of the previous acquisition entities of the first subset of previous acquisition entities according to one or more distributor criteria; and based on the evaluation, designating one or more of the previous acquisition entities of the first subset of previous acquisition entities as the one or more secondary entities;

In one embodiment, the system comprises a rebate computation module comprising instructions stored on the computer storage media, the rebate computation module being configured to determine a click value corresponding to a monetary value to be paid in response to each of a predetermined quantity of respective clicks on first information components by respective reviewing entities, the first information components shared by the acquisition entity in connection with the rebate. The rebate computation module also determines a syndication allocation indicating a first portion of the click value to be paid to the acquisition entity and a second portion of the click value to be paid to respective secondary entities in response to respective clicks on second information components by respective reviewing entities, the second information components shared by the respective secondary entities in connection with the rebate;

In one embodiment, the system comprises a rebate promotion module comprising instructions stored on the computer storage media, the rebate promotion module being configured to transmit an invitation to the one or more secondary entities; receive an indication of acceptance of the invitation from a first of the secondary entities, whereby the first secondary entity becomes a first secondary entity of the second information components and is eligible to receive at least portions of the second portion of the click values. After the rebate promotion module receives indications that a viewer has clicked on second information components posted using one or more social networking accounts of the first secondary entity, the rebate promotion module, in response to a determination that the maximum rebate amount has not been reached and based at least in part upon the syndication sharing percentage, credits the account of the acquisition entity the first portion of the click value, and credits an account of the first secondary entity the second portion of the click value.

These and further embodiments are described in detail below.

BRIEF DESCRIPTION OF THE DRAWINGS

FIG. 18 is a table containing acquisition entities that have participated in a rebate promotion, and may be identified as potential distributors, in accordance with some embodiments.

FIG. 20 illustrates some of the secondary distributor criteria that may be used in some embodiments.

FIG. 21 illustrates various factors that may be used in determining an allocation in accordance with some embodiments.

FIG. 26 is a user interface for displaying rebate data in accordance with some embodiments.

DETAILED DESCRIPTION

A workflow management system enables an acquisition entity to store information components in one or more publicly accessible databases in response to the workflow management systems receiving an event object associated with a unique identifier of the entity. The unique entity identifier is associated with the information components in the databases, such that when reviewing entities access the information component via the databases and perform a similar event, a similar event object with the unique entity identifier is transmitted to the workflow management system. The information components may also be distributed by secondary entities, which may be automatically selected by the workflow management system based on historical data associated with respective secondary entities. The information components stored in online databases by the secondary entities are associated with respective secondary entity identities so that when event objects initiated by those information components is received from by the workflow management system, some or all of the associated event objects are attributable to the appropriate secondary entity.

Figure 1:
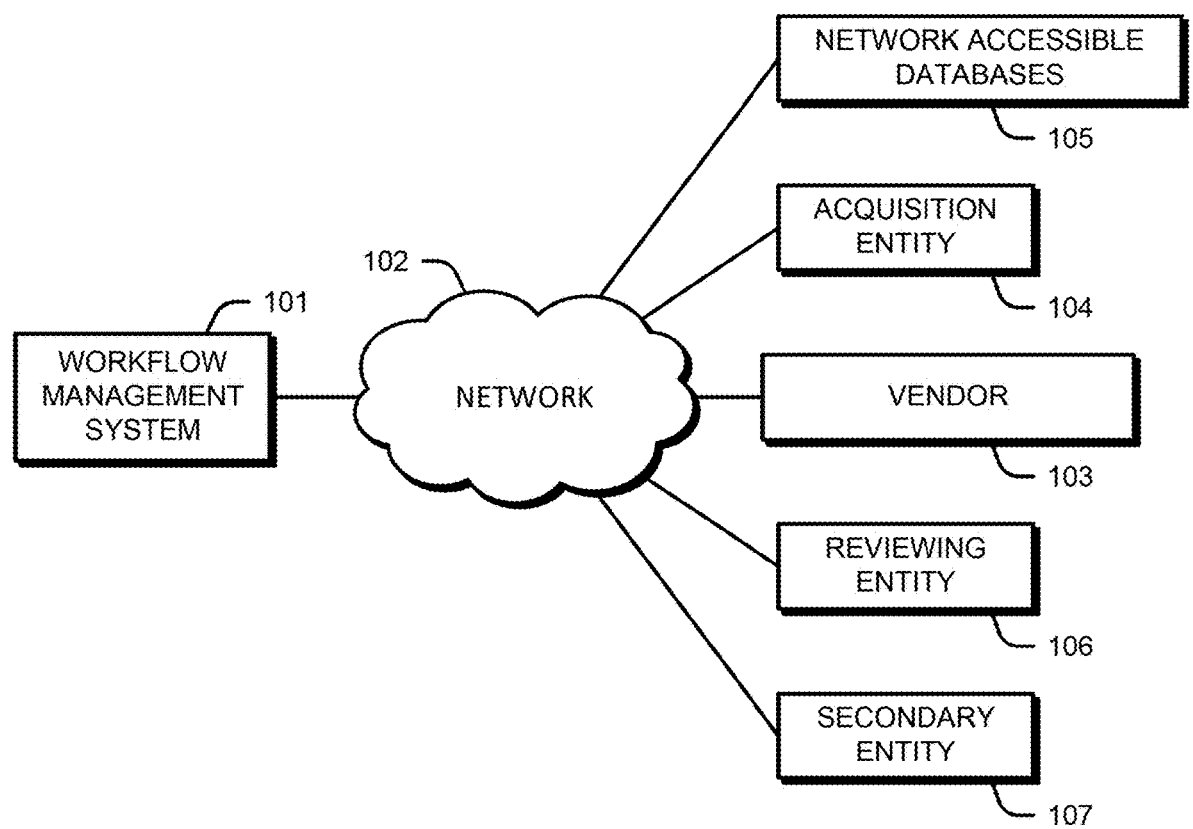
FIG. 1 is a block diagram of a network system including a promotional management system, as used in an embodiment.

FIG. 1 is a block diagram of a network system including a workflow management system, as used in an embodiment. The network system of FIG. 1 may include workflow management system 101 which may be one or more computing servers including computer hardware such as computer processors, volatile and/or nonvolatile storage, input/output devices, network communications devices and the like. In an embodiment, workflow management system 101 includes multiple computing devices connected via a distributed network. In an embodiment, workflow management system 101 includes a cloud computing system. The workflow management system may also be referred to and is synonymous with a "promotion management system."

Workflow management system 101 may be connected to one or more networks 102. The networks may include, for example, any combination of the Internet, LANs, MANs, WANs, cellular communication networks, POTS networks, and so on. In an embodiment, workflow management system 101 communicates with networks 102 via a wired and/or wireless connection such as an Ethernet connection, a Wi-Fi connection, a cable connection, a T1 connection, a DSL connection, a cellular communications connection, and/or the like.

Network 102 may further be coupled with vendor 103, acquisition entity 104, social network 105, reviewing entity 106, and distributor 107. In an embodiment, each of vendor 103, acquisition entity 104, social network 105, reviewing entity 106, and distributor 107 includes one or more computing devices that are connected to network 102 by one or more of the connection technologies described previously and/or by another form of connection.

In an embodiment, each of vendor 103, acquisition entity 104, network accessible databases 105, reviewing entity 106, and distributor 107 may be controlled by one or more users. For example, vendor 103 may comprise a computing device operated by an owner of a retail store and/or an appropriate administrator related to a retail store. Acquisition entity 104 may be a computing device operated by one or more individuals purchasing products. Network accessible databases 105 may be a computing system operating a social network, website, or other related system and controlled by one or more system administrators and/or other users. Reviewing entity 106 may be a computing device operated by one or more individuals viewing information components via a web browser or other application operating on the computing device. Distributor 107 may be a computing device operated by one or more individuals and/or entities distributing information components on behalf of an acquisition entity 104. These and other terms, as used throughout this specification, may refer to the computing device and/or the user or operator of the device, in various embodiments.

Vendor 103 may be a computing device operated by a vendor of goods and/or services. Additionally and/or alternatively, vendor 103 may be any computing system offering services and/or any computing system operated by an entity offering products and/or services, including entities that are not technically vendors, such as wholesalers, individual sellers, etc. Vendor 103 may wish to connect to workflow management system 101 in order to provide rebate promotions to acquisition entities of products, services, and the like from the vendor 103.

Acquisition entity 104 may be a computing device operated by an individual who purchases items from vendor 103, purchases services from vendor 103 and/or otherwise engages in a transaction with vendor 103. Acquisition entity 104 may interact with the same computing device that is vendor 103, with another computing device operated by an entity relating to vendor 103, and/or directly with an entity relating to the computing device. In an embodiment, acquisition entity 104 may be offered a rebate as a result of making such a purchase or entering such a transaction with vendor 103. The rebate may be offered by vendor 103 and/or by another entity such as the manufacturer of the product purchased. The rebate may be offered in an embodiment in exchange for acquisition entity 104 propagating a promotion for vendor 103 and/or another entity.

Network accessible databases 105 may be a social networking system and/or other communication system. In various embodiments, network accessible databases 105 may be a user profile sharing system, a blog, a microblog, a content management system, a user contributed content system, a news website, a community news website, a community submitted content website, an email system, an email mailing list system, a webpage, a news group, and so on.

In an embodiment, acquisition entity 104 places information components relating to a product purchased from vendor 103 (or some other product or entity indicated by the particular promotion) on network accessible databases 105. For example, acquisition entity 104 may submit an entry to a blog relating to the promotion, send one or more emails relating to the promotion, send communications to friends relating to the promotion, and the like. In an embodiment, network accessible databases 105 may enable the content submitted by acquisition entity 104 to be redistributed on the same network accessible databases and/or on other network accessible databases or communication media, thereby enabling the information components to potentially be distributed virally. The term "network accessible databases" may thus refer to a specific type of network service, such as a web site, or to other forms of communication within a network or multiple networks.

Reviewing entity 106 is an individual and/or computing device operated by the individual that receives and views the promotional content shared by acquisition entity 104. For example, reviewing entity 106 may receive an email message, SMS text, and/or other such communication from acquisition entity 104 including the information components. Alternatively, reviewing entity 106 may read the information components from the acquisition entity's website, blog, microblog, submitted content, public user profile, and the like. Reviewing entity 106 may then access content based on the information components such as, for example, clicking a link to a website identified in the information components (e.g., a website of the vendor 103 for the same and/or similar products as were purchased by the acquisition entity 104). In an embodiment, such a click and/or other access may cause the acquisition entity to receive all or a portion of the rebate offered by vendor 103 or other entity. In an embodiment, such access further directs reviewing entity 106 to content on a server offered by vendor 103 or another appropriate entity relating to the information components.

In some situations, an acquisition entity 104 may receive an offer for a rebate in exchange for distributing information components, as described above, but may be unable or unwilling to distribute the information components. For example, purchase 104 may choose not to be a member of social networking sites or may not have a sufficient number of contacts or relationships on those sites to claim a all or a significant portion of the offered rebate. In such cases, acquisition entity 104 may find it difficult or impossible to achieve a sufficient number of interactions with the information components to entitle the acquisition entity to a substantial rebate. In such situations, it would be advantageous for the workflow management system 101 to provide options such that the information components will still be shared.

Thus, in an embodiment, the workflow management system 101 offers the acquisition entity 104 an option to "syndicate" rebate promotions. The process of syndication is discussed in detail throughout this specification. Briefly, an acquisition entity 104 may opt to syndicate a rebate, and where the acquisition entity does so, the workflow management system 101 enables third parties, such as distributors 107, to distribute the same or similar information components on behalf of the acquisition entity 104. When a viewer 106 interacts with the information components posted by a distributor 107, then the rebate may be split between acquisition entity 104 and distributor 107.

As explained above, in various embodiments, promotions and/or information components may be shared, distributed, and otherwise provided. Information components may take on many different forms. For example, in various embodiments, information components may include branded content, advertisements, videos, images, texts, audio, product reviews, and the like. In an embodiment, information components provided to the acquisition entity 104 are directly tied or otherwise related to a transaction performed by the acquisition entity 104, such as a purchase of a product and/or service from the vendor 103.

Figure 2:
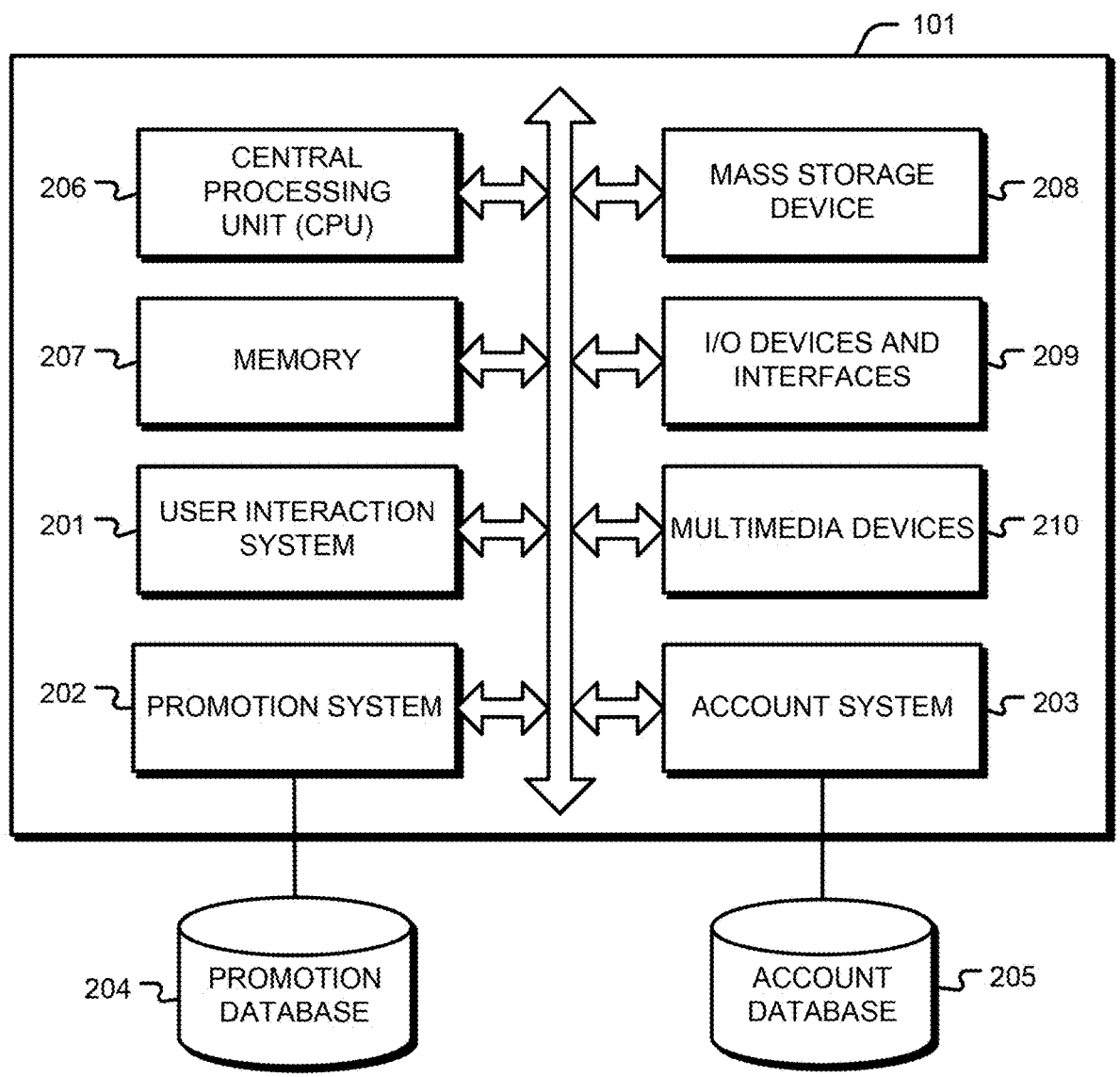
FIG. 2 is a block diagram of a workflow management system, as used in an embodiment.

FIG. 2 is a block diagram of a workflow management system, as used in an embodiment. Workflow management system 101 may be one or more computing devices, including computer hardware. Workflow management system 101 may further include one or more modules which may be implemented as executable instructions in software and/or hardware such as circuitry. Workflow management system 101 may further include data storage systems such as hard disks, read only memory, random access memory, flash memory, removable storage media, and the like.

Workflow management system 101 may include a user interaction system 201 which may be implemented as one or more software and/or hardware modules. In an embodiment, user interaction system 201 may be implemented on independent computing hardware. User interaction system 201 may be configured to handle one or more user interactions. Such user interactions may include, for example, requests to create promotions submitted for vendor 103 (e.g., setting up a new promotion on product X for the vendor 103), requests to engage in rebate promotion transactions initiated by acquisition entity 104 (e.g., the acquisition entity buys product X and signs up for the promotion set up by vendor 103), and/or requests to access information components and/or locations identified in information components made by reviewing entity 106 (e.g., a reviewing entity 106 views information components posted to network accessible databases 105 and clicks on a link).

Promotion system 202 may also be included in workflow management system 101. Promotion system 202 may be implemented as one or more software and/or hardware modules and may be operated on independent computing hardware. Promotion system 202 may be configured to manage promotions, such as rebate promotions. Thus, it may manage parameters and/or other information about current, past, and/or future promotions to be offered.

Promotion system 202 may further communicate with promotion database 204, for example to store and/or retrieve information about promotions. Promotion database 204 may be located within workflow management system 101 and/or located externally and accessed via one or more networks. Promotion database 204 may include in various embodiments a flat file store, a hierarchical file store, a SQL database store, an object oriented database, a multidimensional database, and so on.

Account system 203 may be included in workflow management system 101 and implemented as one or more software and/or hardware modules. In an embodiment, account system 203 may be operated on independent computing hardware. Account system 203 may be configured to manage one or more acquisition entity accounts (e.g., purchaser accounts). Such acquisition entity accounts (e.g., purchaser account records) may include personal information relating to acquisition entities associated with the workflow management system 101. Account system 203 may further maintain information relating to purchases made by respective acquisition entities and/or rebates earned by those acquisition entities. Account system 203 may store and/or retrieve such acquisition entity account data using account database 205. Account database 205 may be local to workflow management system 101 and/or located externally and connected via one or more networks. The account database 205 may be configured in any of the various ways described above with respect to promotion database 204, or in another manner, and account database 205 may be configured in the same manner or in a different manner with respect to promotion database 204.

The workflow management system 101 may be a general purpose computer using one or more microprocessors, such as, for example, an Intel® Pentium® processor, an Intel® Pentium® II processor, an Intel® Pentium® Pro processor, an Intel® Pentium® IV processor, an Intel® Pentium® D processor, an Intel® Core™ processor, an xx86 processor, an 8051 processor, a MIPS processor, a Power PC processor, a SPARC processor, an Alpha processor, and so forth. The computer may run a variety of operating systems that perform standard operating system functions such as, for example, opening, reading, writing, and closing a file. It is recognized that other operating systems may be used, such as, for example, Microsoft® Windows® 3.X, Microsoft® Windows 98, Microsoft® Windows® 2000, Microsoft® Windows® NT, Microsoft® Windows® CE, Microsoft® Windows® ME, Microsoft® Windows® XP, Windows® 7, Palm Pilot OS, Apple® MacOS®, Disk Operating System (DOS), UNIX, IRIX, Solaris, SunOS, FreeBSD, Linux®, or IBM® OS/2® operating systems. In other embodiments, the workflow management system 101 may be controlled by a proprietary operating system. Conventional operating systems control and schedule computer processes for execution, perform memory management, provide file system, networking, I/O services, and provide a user interface, such as a graphical user interface ("GUI"), among other things.

The workflow management system 101 may include one or more central processing units ("CPU") 206, which may each include one or more conventional or proprietary microprocessor(s). The workflow management system 101 may further include one or more memories 207, such as random access memory ("RAM"), for temporary storage of information, read only memory ("ROM") for permanent storage of information, and/or a mass storage device 208, such as a hard drive, diskette, or optical media storage device. The memory 207 may store software code, or instructions, for execution by the processor 206 in order to cause the computing device to perform certain operations, such as gathering sensor-related data, processing the data with statistical and/or predictive models, formatting data for user devices or other presentation, transmitting data, or other operations described or used herein.

The methods described and claimed herein may be performed by any suitable computing device, such as the workflow management system 101. The methods may be executed on such suitable computing devices in response to execution of software instructions or other executable code read from a non-transitory tangible computer readable medium or computer storage device. A computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

The workflow management system 101 may include one or more input/output (I/O) devices and interfaces 209, such as a keyboard, trackball, mouse, drawing tablet, joystick, game controller, touchscreen (e.g., capacitive or resistive touchscreen), touchpad, accelerometer, and/or printer, for example. The workflow management system 101 may also include one or more multimedia devices 210, such as a display device (also referred to herein as a display screen), which may also be one of the I/O devices 209 in the case of a touchscreen, for example. Display devices may include LCD, OLED, or other thin screen display surfaces, a monitor, television, projector, or any other device that visually depicts user interfaces and data to reviewing entities. The workflow management system 101 may also include one or more multimedia devices, such as speakers, video cards, graphics accelerators, and microphones, for example.

In the embodiment, the I/O devices and interfaces 209 provide a communication interface to various external devices via a network such as network 101 of FIG. 1. For example, the workflow management system 101 may be electronically coupled to the network 101 via a wired, wireless, or combination of wired and wireless, communication link(s). The network 101 may allow communication with various other computing devices and/or other electronic devices via wired or wireless communication links.

In an embodiment, the workflow management system 101 may include modules as described above with respect to user interaction system 201, promotion system 202, and account system 203, as well as other modules or fewer modules. Each of these modules is discussed in further detail below. In general, the word "module," as used herein, refers to logic embodied in hardware or firmware, or to a collection of software instructions, possibly having entry and exit points, written in any programming language, such as, for example, Java, Python, Perl, Lua, C, C++, C #, Objective C, etc. A software module may be compiled and linked into an executable program, installed in a dynamic link library, or may be written in an interpreted programming language such as, for example, BASIC, Perl, or Python. Software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the workflow management system 101, for execution by the computing device. Hardware modules may be comprised of connected logic units, such as gates and flip-flops, and/or may be comprised of programmable units, such as programmable gate arrays or processors. The modules described herein are typically implemented as software modules, but may be implemented in hardware, firmware and/or software. Generally, the modules described herein refer to logical modules that may be combined with other modules or divided into sub-modules despite their physical organization or storage.

Figure 3:
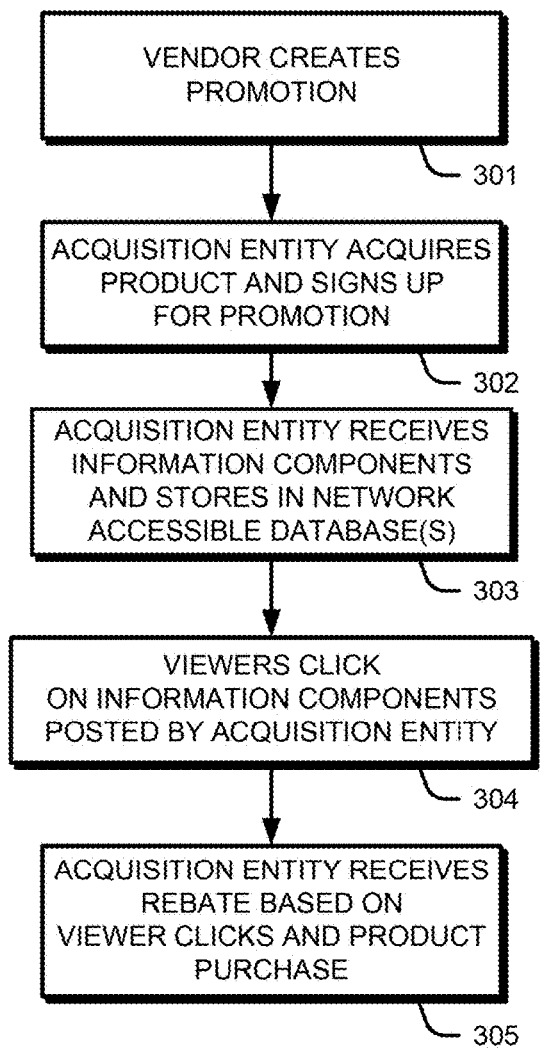
FIG. 3 is a flowchart of a process of providing a rebate promotion, as used in an embodiment.

FIG. 3 is a flowchart of a process of providing a rebate promotion, as used in an embodiment. In various embodiments, additional blocks may be included, some blocks may be removed, and/or blocks may be connected or arranged differently from what is shown.

At block 301, a vendor, such as vendor 103, creates a rebate promotion for one or more products. The rebate promotion may offer, for example, that an acquisition entity who purchases a product may receive a rebate of up to a certain percentage (e.g., of the cost of the product) and/or dollar amount, for example, in exchange for initiating interactions with information components of the vendor by promotion reviewing entities 106.

At block 302, an acquisition entity, such as acquisition entity 104, buys a product associated with the rebate promotion. The acquisition entity may then be offered the option to participate in the rebate promotion. If the acquisition entity signs up for the rebate promotion, then at block 303, the acquisition entity 104 may receive information components for posting at various locations online. The acquisition entity 104 may then post the received information components at various locations, such as social networks, websites, emails, and/or other locations.

At block 304, one or more promotion reviewing entities such as reviewing entity 106 clicks on the information components posted by the acquisition entity 104 at block 303. As a result, at block 305, the acquisition entity may receive a rebate, based on the promotion reviewing entities clicks form block 304 and further based on details of the rebate promotion established by the vendor 103, such as a per-click rebate provided to the acquisition entity 104 in response to each unique reviewing entity click on information components posted by the acquisition entity 104.

Depending on the promotion parameters of the particular rebate promotion, various interactions between promotion reviewing entities and posted information components may qualify to provide the acquisition entity with the rebates at block 305. For example, rather than clicking on a link in the information components, the reviewing entity may be required to make a purchase of a product, view content such as a video, complete a survey, or the like as indicated in the particular rebate promotion, in order to receive a rebate. In a further embodiment, a rebate may be granted to the acquisition entity when the reviewing entity chooses to participate in the rebate promotion as well, thereby creating a hierarchical rebate scheme.

Figure 4:
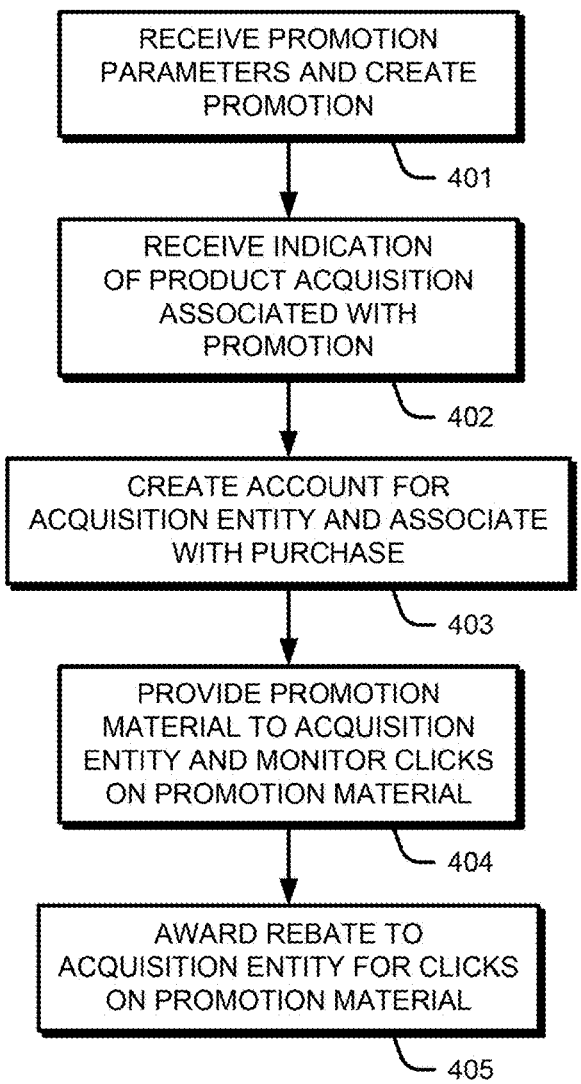
FIG. 4 is a flowchart of a process of offering promotions, as used in an embodiment.

FIG. 4 is a flowchart of a process of offering promotions, as used in an embodiment. The process may be performed, for example, by workflow management system 101 of FIG. 1. In various embodiments, additional blocks may be included, some blocks may be removed, and/or blocks may be connected or arranged differently from what is shown.

At block 401, the workflow management system may receive promotion parameters from a vendor for a rebate promotion. The workflow management system may then create and/or store a new rebate promotion. The appropriate promotion parameters may be stored in promotion database 204, for example, through operation of promotion system 202. The promotion parameters may include, for example, a maximum rebate (e.g., a percentage of a product purchase price and/or a maximum dollar amount), a quantity of interactions required to reach the maximum rebate, interactions that qualify for payment of at least a portion of the maximum rebate, information on various formats of information components to provide to acquisition entities (such as text, images, audio, video, and/or other media), and/or other data that is used by the workflow management system to manage the rebate promotion.

At block 402, the workflow management system may receive an indication of a purchase of a product associated with the rebate promotion created at block 401. The received indication may originate from an acquisition entity of the product and/or from the vendor selling the product. In various embodiments, the indication may relate to a transaction other than a purchase of a product such as the purchase of a service. In response to receiving this indication, at block 403, the workflow management system may create an account for the acquisition entity (if an account does not already exist) and associates that account with the purchase or other transaction. In an embodiment, the workflow management system may determine that the acquisition entity has an existing account and may thus associate the purchase or other transaction with that existing account.

At block 404, the workflow management system may provide information components to the acquisition entity. The information components may be provided to the acquisition entity by being directly sent to the acquisition entity and/or by being automatically posted to third party locations such as social networking sites either automatically or at the request of the acquisition entity. The information components may be in various formats that are suitable for different delivery channels, such as a first information components formatted for delivery via email and a second information components formatted for posting on a microblog. In some embodiments, the acquisition entity is provided an opportunity to include a personal endorsement of the product for inclusion in the information components generated by the workflow management system.

The workflow management system may be configured to monitor clicks and/or other appropriate transactions relating to the information components. For example, a link in the information components may be directed to the workflow management system or associated computing system. Additionally or alternatively, the workflow management system may be configured to monitor activity on the locations to which the information components was posted, locations linked by the information components and/or other appropriate locations. Through such configuration, the workflow management system may thus be enabled to identify the occurrence of appropriate events that entitle the acquisition entity to rebates or other rewards.

At block 405, the workflow management system may award a rebate (e.g., a portion of a maximum rebate offered to a particular acquisition entity) to the acquisition entity. The type and/or quantity of rebate or award may be determined based on factors such as the promotion parameters received at block 401, the nature of the purchase at block 402, the nature of the acquisition entity, and/or the nature of the interaction with the information components at block 405. Thus, for example, the acquisition entity may receive a certain rebate each time a reviewing entity clicks on a link in the information components (e.g., until a maximum rebate is reached), and may then receive a larger rebate if the reviewing entity makes a purchase based on the information components.

For example, in certain implementations, a click alert, indicating a click on information components, may by automatically transmitted to the workflow management system in response to a reviewing entity clicking the information components. The click alert may be operable to automatically activate the account system (or other software) in order to automatically determine a partitioning of a rebate portion to assign to each of the acquisition entity and/or secondary distributor associated with the information components. Furthermore, the rebate awards may be automatically communicated, such as in realtime as they are associated with the database records of the entities, to the respective entities. Such communications may be automatically transmitted to the entity (e.g., the acquisition entity and/or the secondary entity) in one or more modes of communication, such as, for example, electronic mail, text messaging, and regular postal mail, to name a few. In certain modes of communication to the entity, the communication may be configured to automatically operate on the entity's electronic device. For example, the entity's mobile device may, upon receipt of the transmitted communication, may activate a software application installed on the entity's mobile device to deliver the communication to the entity (e.g., a SMS viewer or application may automatically display information from the communication when received by the device or when the device is connected to the internet). Alternatively, the communication may activate a web browser and access a web site to present the communication to the entity. In another example, a communication may be transmitted to an entity's email account and, when received, automatically cause the entity's device, such as a computer, tablet, or the like, to display the transmitted communication or a link to take the entity to a webpage with additional account information.

Figure 5:
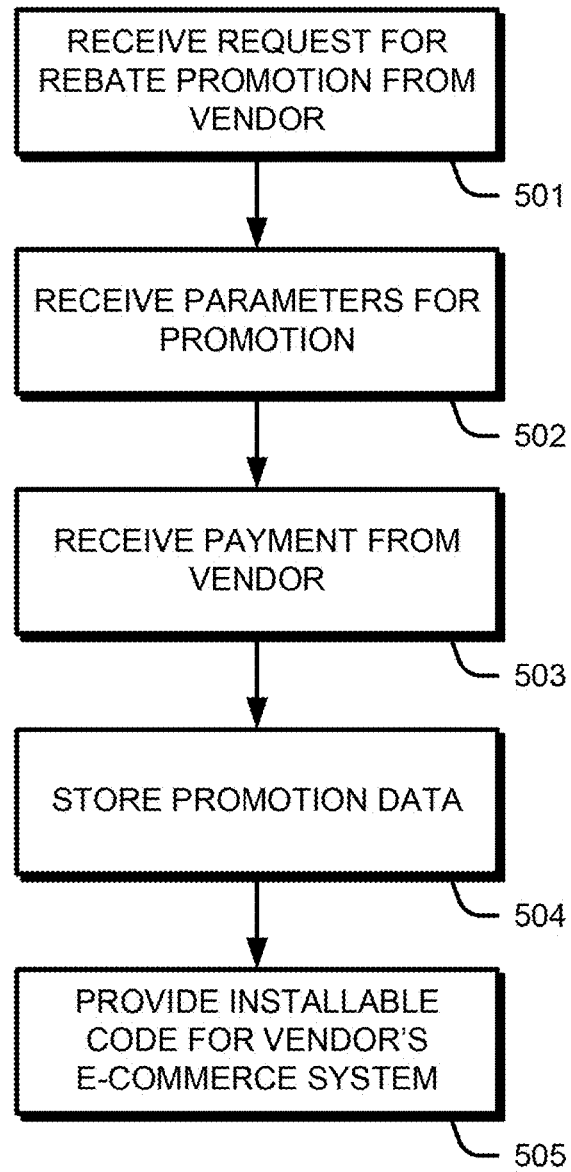
FIG. 5 is a flowchart of a process of creating a rebate promotion, as used in an embodiment.

FIG. 5 is a flowchart of a process of creating a rebate promotion, as used in an embodiment. The process may be performed, for example, at block 301 of FIG. 3 and/or block 401 of FIG. 4. The process may be performed, for example, by workflow management system 101 of FIG. 1. In various embodiments, additional blocks may be included, some blocks may be removed, and/or blocks may be connected or arranged differently from what is shown.

At block 501, the workflow management system receives a request for a rebate promotion from a vendor. The request may be transmitted, for example, through a network request such as an HTTP request. The request may be initiated directly by the vendor, by an entity associated with the vendor, by an operator of the promotion management server at the direction of a vendor or associated entity, and so on.

At block 502, the workflow management system receives parameters for the promotion to be created. Such promotion parameters may define the terms and/or scope of the promotion. Various examples of promotion parameters are described throughout the specification. The promotion parameters may be received simultaneously with the request for the rebate promotion at block 501 and/or subsequent to the request.

At block 503, the workflow management system receives payment from the vendor. The amount of payment may be determined based on the promotion parameters for the rebate promotion received at block 502. In an embodiment, the amount of the payment received from the vendor servers as a further parameter to the promotion, for example, by limiting the quantity of rebates offered to qualified acquisition entities. In various embodiments, the payment may be received at different times. For example, payment may be received on a periodic basis, such as a monthly basis. In various embodiments, the payment may be received before and/or after rebates have been given to acquisition entities. In an embodiment, the vendor is charged at the time an acquisition entity earns a rebate (for example, at the time a reviewing entity makes clicks on information components shared by the acquisition entity). In an embodiment, the vendor pre-pays for promotions, for example by maintaining a standing account balance with the workflow management system, so no payment need be deducted at the time of creating a particular promotion. In an embodiment, the timing of payment may be made flexible to accommodate the needs of various vendors, allowing the vendor to select from one of various payment options.

At block 504, the workflow management system stores appropriate promotion data based on the promotion parameters received at block 502 and/or payment received at block 503. Additionally, at block 505, the workflow management system may provide code (e.g., installable code) for the vendor's e-commerce system. Such code may enable the vendor to provide appropriate user interfaces to allow acquisition entities to be notified of and to enroll in rebate promotions offered by the vendor. In an embodiment, various installable plug-ins are provided in order to accommodate a variety of content management or shopping systems. In an embodiment, the code may include client site code, such as JavaScript code, and/or server site code.

The code provided at block 505 may include items specific to the rebate promotion and/or security related items. In an embodiment, the code may include one or more keys such as an API key, a promotion identifier, a vendor identifier, and the like. Other security information may include authentication credentials and/or cryptographic keys such as public and/or private keys. Thus, the information provided may enable the vendor, acquisition entities, and/or other entities to uniquely identify the vendor and/or promotion being offered.

In an embodiment, certain portions of the code are provided at block 505 and other portions are provided at different times and/or at different locations. For example, in an embodiment, the portions of the code specific to the rebate promotion are provided at block 505 and the nonspecific portions, such as general code to interface with shopping cart or CMS software, are provided at a different time and/or location (for example, the nonspecific portions may be made available via an independent source code repository).

Figure 6:
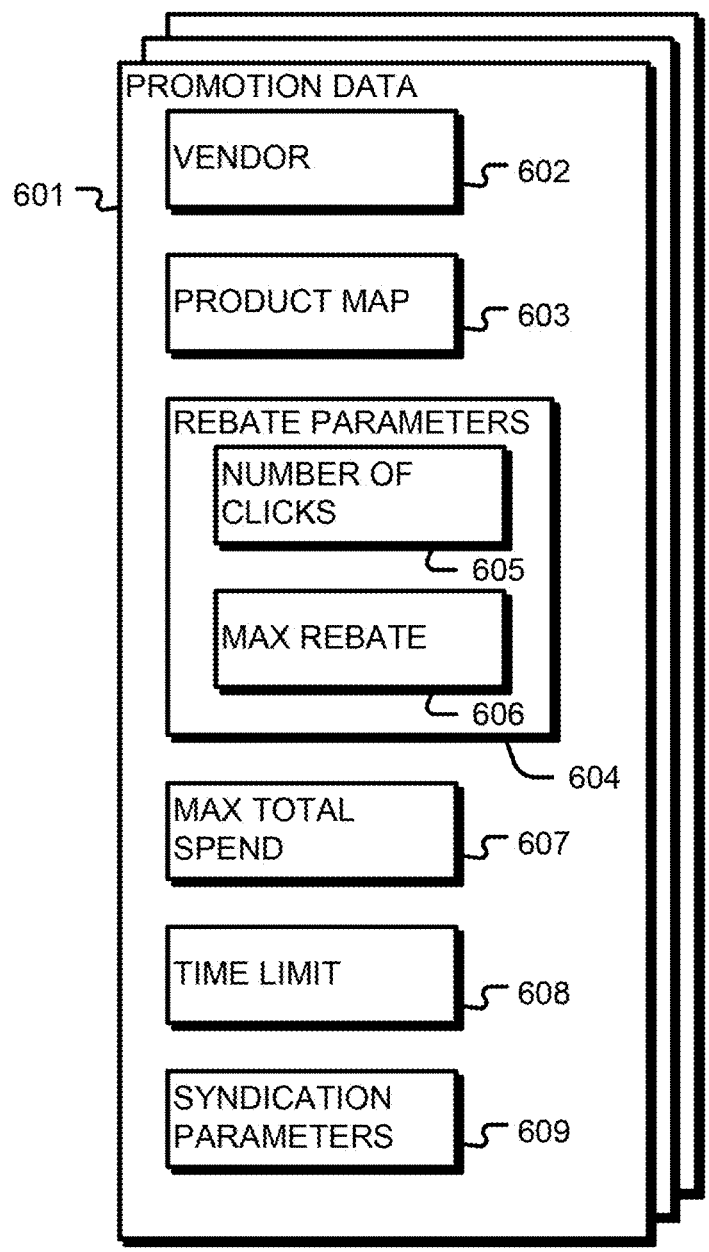
FIG. 6 is a block diagram of an example data structure of promotion data, as used in an embodiment.

FIG. 6 is a block diagram of an example data structure of promotion data, as used in an embodiment. Such a data structure may be used, for example, at block 504 of FIG. 5. The data structure may be stored, for example, in promotion database 204 of FIG. 2. The data structure may be stored on computer-readable media such as a hard drive, SSD, tape backup, distributed storage, cloud storage, and so on, and may be structured as relational database tables, flat files, C structures, programming language objects, database objects, and the like. In various embodiments, additional elements may be included, some elements may be removed, and/or elements may be arranged differently from what is shown.

Promotion data 601 may contain various data elements relating to rebate promotions. Promotion data 601 may include the same data as promotion parameters received from a vendor (such as those received at block 401 of FIG. 4), any subset of the promotion parameters, data derived from promotion parameters, and/or other data.

Promotion data 601 may include one or more data elements. For example, vendor data 602 may identify the vendor associated with a particular promotion. Product map 603 may include appropriate data to identify products that qualify for particular rebate promotions. Product map 603 may include, in various embodiments and/or situations, a list of products, a list of product categories, identifiers of product attributes, general rules for selecting products, and/or the like. In an embodiment, all products offered by the vendor may be included in a promotion in which case product map 603 may be blank and/or otherwise identify all such products.

Rebate parameters 604 may include information relating to the rebates to be offered with the promotion. Such parameters may be used, for example, to determine the amount of the rebate to be offered. In an embodiment, rebate parameters 604 may include a number of clicks 605 and a maximum rebate 606 which may be a dollar amount and/or percentage. For example, in an embodiment, the number of clicks for a rebate may be set to 10 and the maximum rebate may be set to 20%. In such an embodiment, an acquisition entity would be able to obtain up to a 20% rebate if 20 clicks are made on the information components. If fewer than 20 clicks are made then a smaller rebate may be offered, with the magnitude of the rebate being determined by an appropriate formula or calculation.

In an embodiment, the partial rebate is determined by a linear interpolation based on the number of clicks received. Thus, in the example provided above, an acquisition entity may receive a 14% rebate if the information components is clicked 7 times. In other embodiments, the partial rebate may be determined by nonlinear formulas to encourage different promotion strategies. For example, in one embodiment, an acquisition entity may receive no rebate for zero to four clicks, a 5% rebate for five to nine clicks, and a 20% rebate for 20 or more clicks. In various embodiments, additional and/or different parameters, different rebate parameters may be used for determining the appropriate rebate. The parameters may include, for example, timing of clicks, types of individuals clicking, activities performed by promotion reviewing entities (such as product purchases) and the like.

Promotion data 601 may further include limitations on the promotion. For example, promotion data 601 may include a maximum total spending amount 607 which may be used to limit the number and/or amount of promotions offered. The maximum total spending 607 may be a total maximum amount of spending, a maximum amount of spending per period such as per month, a maximum number of rebates to offer, a maximum number of rebates to offer per period such as per day, and so on. By comparing the number and/or amount of rebates offered by acquisition entities with the maximum total spending amount 607, the workflow management system may determine whether or not to offer further rebates to acquisition entities. For example, the workflow management system may calculate the total amount of rebates offered within a particular promotion and stop offering the rebate promotion if that amount exceeds the maximum total spending amount 607. In the case where some or all acquisition entities have received partial rebates but are still able to continue earning further rebates for additional clicks, the workflow management system may estimate a likely number of clicks to be obtained by those acquisition entities in order to calculate the current spending amount.

Promotion data 601 may further include one or more time limits 608. The time limits may be, for example, a time limit on the overall promotion and/or a time limit for a particular acquisition entity to earn rebates. The latter form of time limits may be useful for example to assist in the calculation of the total spending for a particular promotion. For example, if a time limit of 10 days is set, then an acquisition entity may receive rebates for up to that 10-day period but may not receive rebates thereafter for the same purchase. During that 10-day period, the workflow management system may assume that the full rebate and/or a partial rebate may be awarded to that acquisition entity and it may then disable further rebates due to a maximum total spending limit being hit. However, after that 10 day period, the workflow management system may determine that the acquisition entity has not earned the anticipated full or partial rebate, so it may be able to offer further rebates to acquisition entities while remaining within the maximum total spending limit. Thus, such time limits may enable the workflow management system to offer a greater number of rebates to acquisition entities within specified spending limits.

Promotion data 601 may further include syndication parameters 609. The syndication parameters may be used to determine whether syndication is permitted and/or the parameters for revenue sharing when syndication is used. In an embodiment, syndication parameters 609 include a syndication sharing percentage that may be used to determine the revenue sharing. Following the example from above, a promotion may offer a 20% rebate for up to 10 clicks on information components posted by the acquisition entity, such that each click is worth a 2% rebate. The syndication sharing percentage may be 25%. Thus, when a viewer clicks on information components shared by a distributor on behalf of an acquisition entity within this rebate promotion, the distributor would receive a 0.5% rebate, and the acquisition entity would earn a 1.5% rebate. Syndication parameters may further include details regarding selection of distributors that may be selected for optimizing syndication of a promotion. FIGS. 19-26, discussed in further detail below, describe various parameters that may be used to payments between distributors and acquisition entities.

In various embodiments, the syndication sharing percentage may be fixed across some or all rebate promotions, and/or the syndication sharing percentage may be selected by the vendor creating the rebate promotion. The workflow management system may enable syndication across all rebate promotions, or vendors may be able to select whether to enable syndication for particular promotions. Additionally, the revenue sharing from syndication between distributors and acquisition entities may be a variable function rather than a fixed percentage.

Also in some embodiments, the revenue shared between a distributor and an acquisition entity may total more or less than the revenue that would ordinarily have been earned by the acquisition entity alone. For example, a rebate promotion such as that described above may provide a 2% rebate per click when the information components is shared by an acquisition entity, but when syndicated, the promotion may offer a 0.75% rebate per click to both the acquisition entity and the distributor. In this example, syndication of rebates may be discouraged; other percentages may be selected to encourage or discourage syndication as desired by the vendor and/or workflow management system.

Promotion data 601 may further include data relating to the information components. For example, promotion data 601 may include images, promotional text, videos, audio, hyperlinks to one or more locations, and the like. Such material may be specified by vendors during the process of creating promotion data 601.

Figure 7:
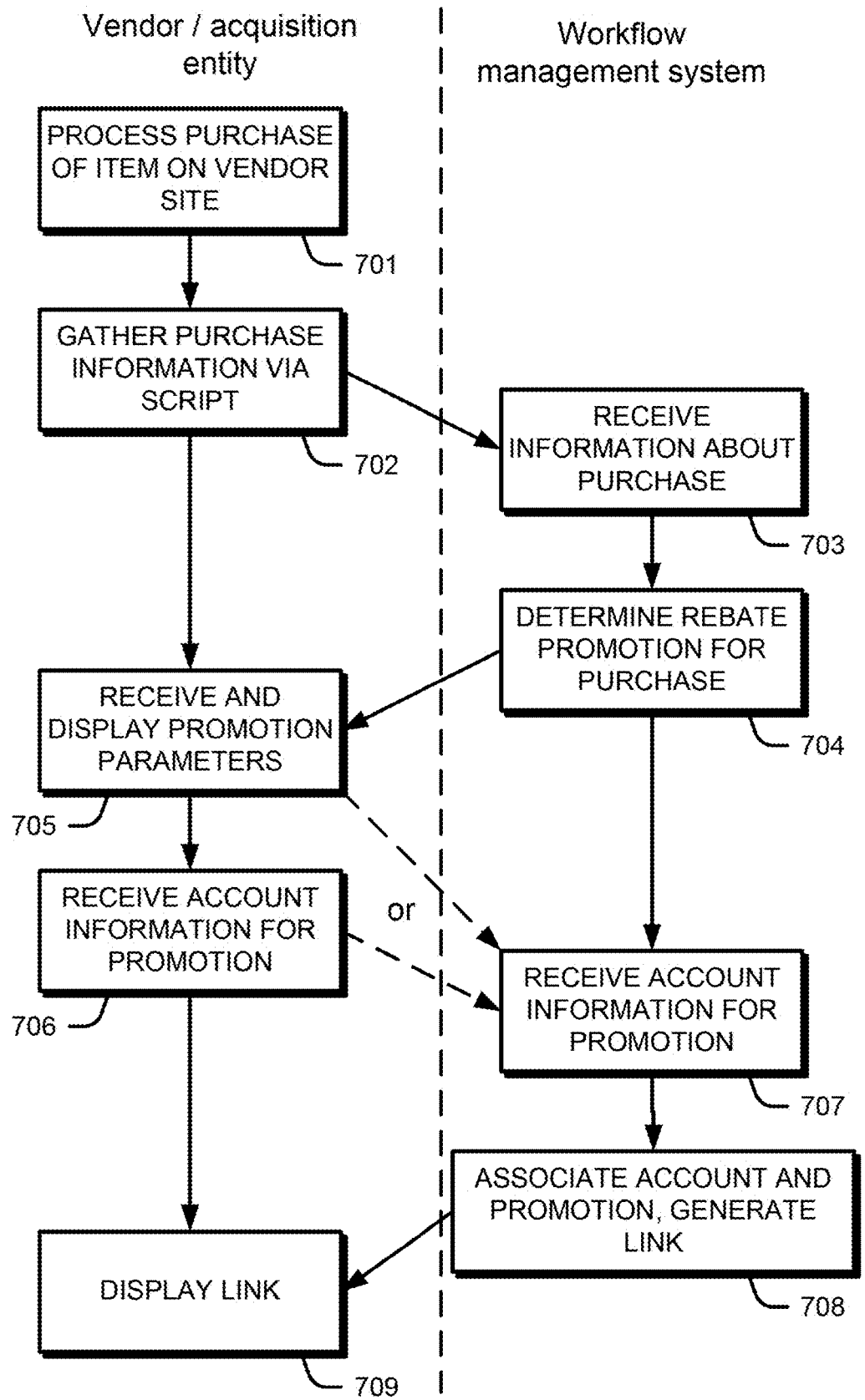
FIG. 7 is a flowchart of a process of managing a purchase of an item associated with a promotion, as used in an embodiment.

FIG. 7 is a flowchart of a process of managing a purchase of an item associated with a promotion, as used in an embodiment. In an embodiment, the process is performed at blocks 302 and 303 of FIG. 3, and/or blocks 402-404 of FIG. 4. In an embodiment, certain blocks of FIG. 7 are performed by vendor 103 and/or acquisition entity 104 and certain blocks are performed by workflow management system 101. In various embodiments, additional blocks may be included, some blocks may be removed, and/or blocks may be connected or arranged differently from what is shown.

At block 701, the vendor processes the purchase of an item on the vendor's site. Processing the purchase of an item may occur at the time when the acquisition entity viewed a shopping cart on the vendor's website, provides payment information, receives checkout confirmation, and/or another appropriate time.

At block 702, the vendor gathers purchase information via a script and/or other system operated by the vendor. In an embodiment, the purchase information is gathered by a client side script running on a web browser of the acquisition entity. The client side script may be included as part of a web page and/or other content sent by the vendor, and it may scrape and/or otherwise analyze the page or other content to determine appropriate information such as items purchased and/or amounts spent. In alternate embodiments, server side code, such as a plug-in, may be operated on the vendor's site or an associated site, to automatically gather the appropriate purchase information. Such plug-ins may be designed for existing content management systems, shopping cart systems, database systems and the like. The appropriate purchase information may then be sent via network and/or other means to the workflow management system.

At block 703, the workflow management system receives information about the purchase. The information may be received in response to a network transaction sent by the vendor and/or acquisition entity, or the information may be received upon the workflow management system sending an appropriate query to the vendor and/or acquisition entity, for example, on a periodic basis. The information about the purchase may include information about items purchased and/or amounts spent. The information about the purchase may further include information relating to a particular promotion. Such information may include, for example, a promotion ID, a vendor ID, an API key, security credentials, and the like.

At block 704, the workflow management system determines a rebate promotion for the purchase. The rebate promotion data may be structured, for example, in the form shown in FIG. 6. The determination may be performed, for example, by promotion system 202 of FIG. 2. In an embodiment, the workflow management system may determine that multiple promotions are appropriate for a given purchase, for example, when two items associated with different promotions are purchased. Upon determining the appropriate rebate promotion, the workflow management system determines appropriate parameters associated with the promotion and sends those to the vendor and/or acquisition entity. Such parameters may include, for example, a rebate percentage and/or dollar amount and/or a number of clicks required to obtain the maximum rebate amount.

At block 705, the vendor and/or acquisition entity receives and displays the promotion parameter received from the workflow management system. In an embodiment, the promotion parameters are displayed on the vendor's webpage. Additionally or alternatively, the promotion parameters may be sent to the acquisition entity by email and/or other communication. The acquisition entity may then be given the option to sign up for the promotion. In an alternate embodiment, the acquisition entity may be automatically signed up for the promotion without any required interaction by the acquisition entity.

If the acquisition entity chooses to participate in the promotion, then at block 706, account information is received for the promotion. The account information may be manually entered by the acquisition entity and/or automatically drawn from the vendor's systems. The account information may be received by the vendor and then transmitted to the workflow management system, or it may be received directly at the workflow management system, for example, by a website form submission, as shown in block 707.

At block 708, the workflow management system creates an account for the acquisition entity based on the received account information. If an account already existed for the acquisition entity, then that account may be used rather than creating a new account. The account is associated with the promotion to enable the acquisition entity to earn rebates based on that promotion. The workflow management system may then generate appropriate information components such as a promotion link. The information components is then sent to the vendor and/or acquisition entity, for example, it may be displayed on the vendor's website and/or sent to the acquisition entity by email or other communication.

In an embodiment, the promotion link is a short URL link directed to the workflow management system and/or an associated computer system. The short link may include identifiers, for example in the path and/or query parameters of the URL, that may identify the vendor, rebate promotion, acquisition entity, and/or other relevant information. In an embodiment, the short link may instead include an identifier that links to a database record or other record stored in the workflow management system, allowing the system to identify the vendor, rebate promotion, acquisition entity, and/or other relevant information without some or all of that information being directly identified in the short link.

Figure 8:
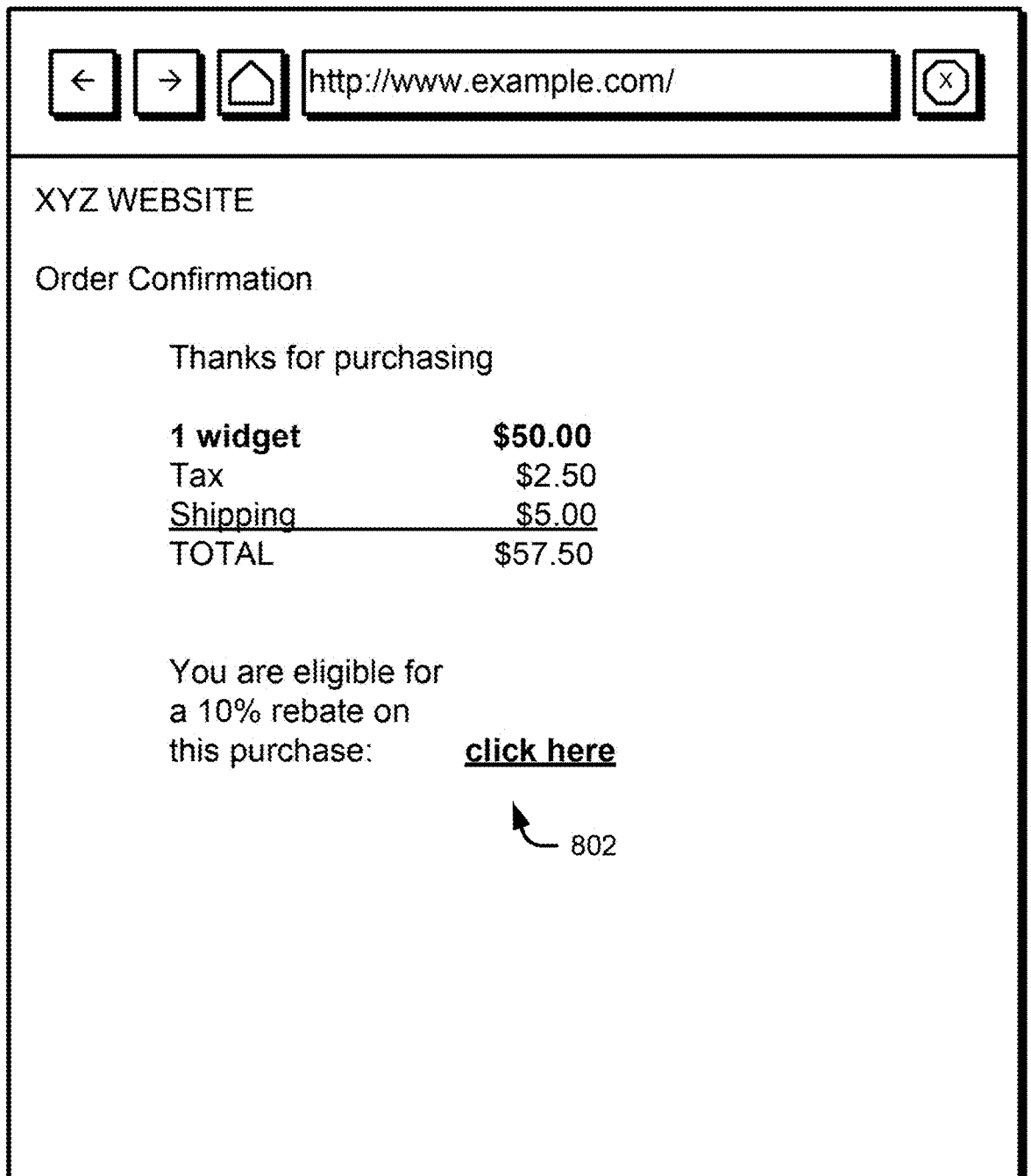
FIG. 8 is a sample user interface enabling an acquisition entity of a product on a vendor's website to participate in a rebate promotion, as used in an embodiment.

FIG. 8 is a sample user interface enabling an acquisition entity of a product on a vendor's website to participate in a rebate promotion, as used in an embodiment. User interface 801 may be, for example, a webpage displayed on a web browser operated by the acquisition entity.

User interface 801 may be, in an embodiment, an order confirmation page. In various embodiments, the webpage may be a different webpage at a different part of the shopping process, such as a checkout page, a shopping cart page, a payment entry page or the like. Link 802 on the user interface enables the acquisition entity to participate in the rebate promotion by clicking on the link. In various embodiments, rather than a clickable link, other user interface elements may be employed such as a check box, a touchable button, a slideable button, a text entry field, and so on. The user interface may further indicate information relating to the rebate promotion such as text indicating the amount of the rebate.

Figure 9:
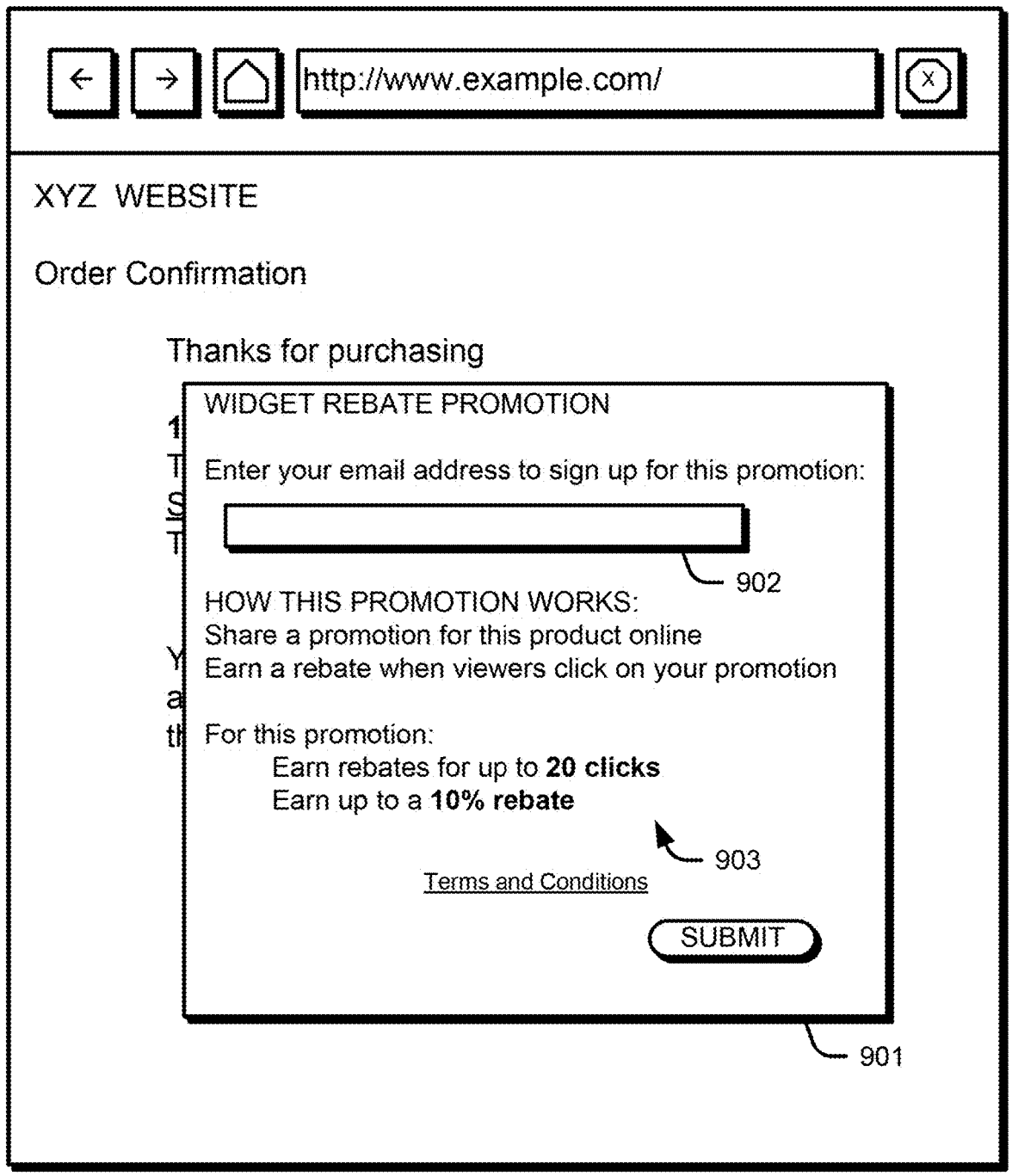
FIG. 9 is a sample user interface allowing the acquisition entity to sign up for a rebate promotion, as used in an embodiment.

FIG. 9 is a sample user interface allowing the acquisition entity to sign up for a rebate promotion, as used in an embodiment. The user interface may include user interface element 901 which may be displayed as a popup window, as an internal frame within a webpage, as a separate webpage or the like. The interface may include an input control configured to receive acquisition entity information, such as text field 902 that is configured to receive the acquisition entity's email address. In an embodiment, the email address may be automatically drawn from the vendor's data and/or from another data source so that the email address may be automatically included in text field 902 or otherwise automatically provided to the workflow management system. In an embodiment, the user may be able to change the email address through text field 902 or other interface elements thereby enabling the user to use different email addresses for the rebate promotion and for the vendor sites. In various embodiments, information different from or in addition to the email address may be requested by the workflow management system using interface element 901 or another interface.

User interface element 901 may further include information about the rebate promotion 903. Such information may include the number of clicks and/or other actions that can earn rebates. It may further include the percentage and/or dollar amount of the rebate. It may further include other information about the rebate promotion such as a time limit. Information about the rebate promotion may be displayed directly in user interface element 901 and/or on a separate page such as a terms and conditions page which may be linked within user interface element 901.

In an embodiment, rather than displaying user interface element 901 or other interface to receive acquisition entity information for a rebate promotion, the vendor and/or workflow management system may simply accept the request to participate in the rebate promotion through an interaction with interface element 802 of FIG. 8. Thus, for example, the vendor may simply store, in a database, an indication that an acquisition entity has indicated interest in participating in a rebate promotion. The vendor may then inform the workflow management system about the acquisition entity, and/or the workflow management system may periodically or otherwise query the vendor for acquisition entities who have indicated interest in participating in the rebate promotion. The workflow management system and/or vendor may then contact the acquisition entity, for example by email, without the need to display an interface such as user interface element 901. The vendor and/or workflow management system may determine the email address of the acquisition entity using the vendors existing database records, or from user input provided during the shopping cart checkout process.

Figure 10:
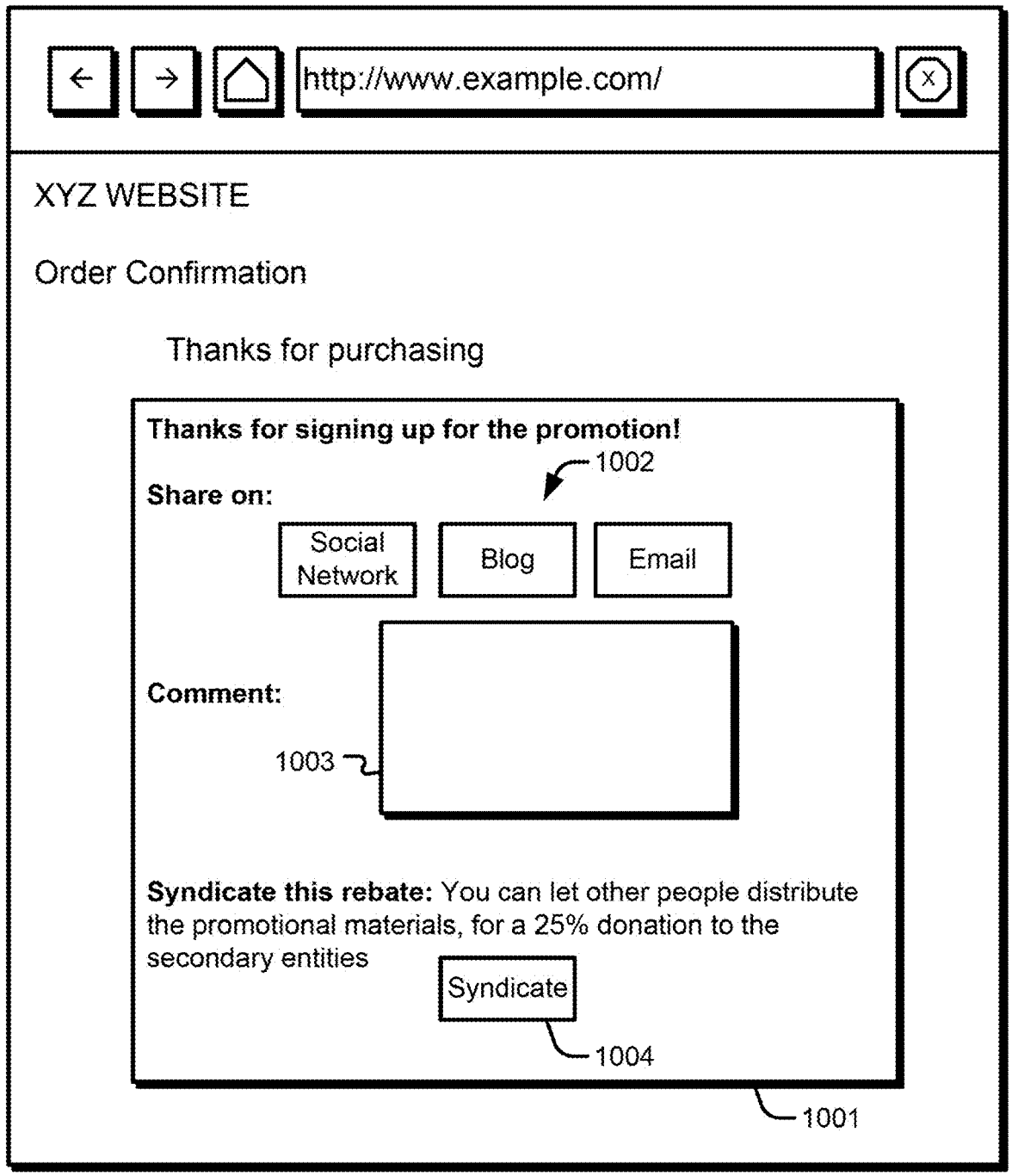
FIG. 10 is a sample user interface for sharing information components as used in an embodiment.

FIG. 10 is a sample user interface for sharing information components as used in an embodiment. The interface of FIG. 10 may be displayed, for example, subsequent to the interface shown in FIG. 9. In various embodiments, the interface may be displayed on the vendor's webpage in a popup window, in a separate window, on a separate webpage, and/or in another communication such as an email communication. User interface element 1001 may include information relating to the rebate promotion for which the acquisition entity has signed up. The example user interface element 1001 includes various buttons 1002 and/or other interface elements that enable the acquisition entity to share the information components at various locations such as a social network, a blog, and/or emails. In an embodiment, when an acquisition entity clicks or otherwise selects one or more of interface elements 1002, the workflow management system automatically posts the appropriate information components to the selected location. In an embodiment, the information components is specifically customized based on the location to which it will be posted so that, for example, information components posted on a social network may be formatted different from information components sent by email. In an embodiment, the information components comprises a link that may be provided directly to the acquisition entity so that it may be posted by the acquisition entity at the acquisition entity's discretion. In an embodiment, the link or other information components is not directly provided to the acquisition entity, thus providing a degree of control over the posting of the information components. In such an embodiment, the links and/or other information components may be automatically embedded within the various options.

In an embodiment, when the acquisition entity selects one or more of interface elements 1002, the acquisition entity's browser automatically executes client side code to post the information components to the appropriate location. In such a case, neither the workflow management system nor the vendor needs to communicate with external systems in order to post the information components.

User interface element 1001 may further include a comment block 1003 so that the acquisition entity may include a customized comment. In an embodiment, when the acquisition entity provides a customized comment that comment may be automatically included in the posting of information components. In various embodiments, the comments provided in block 1003 may be formatted appropriately for the location to which the information components is being posted. The comment block may enable the acquisition entity to provide customized messages to particular individuals, reviews of the product, personalized recommendations, and so forth. Such comments may thus increase the efficacy of the information components in attracting attention and/or interest by reviewing entities. In various embodiments, acquisition entity feedback other than or in addition to a comment may be solicited, such as a star rating, a like/dislike indication, a list of tags, and so on.

User interface element 1001 may further include option 1004 to syndicate the rebate. This option may be shown based on whether syndication is available for the rebate promotion. By selecting option 1004, the workflow management system or other appropriate system may record the acquisition entity's desire to syndicate the rebate promotion for the acquisition entity. The workflow management system or other appropriate system may further perform steps in furtherance of the syndication, such as notifying potential distributors of the syndicated rebate promotion. The user interface may further identify the revenue sharing scheme for syndication: user interface element 1001, for example, indicates that 25% of the rebate will go to distributors if the rebate promotion is syndicated. Thus, if syndication is indicated (e.g., allowed by the vendor and/or workflow management system), a maximum value increment (e.g., maximum rebate) may be partitioned between the acquisition entity and the secondary entity based on a fractional relationship (e.g., determined based on a sharing scheme) indicating a first portion of the value increment per click associated with the acquisition entity and a second portion of the value increment per click associated with respective secondary entities in response to respective clicks on information components shared by respective secondary entities.

Figure 11:
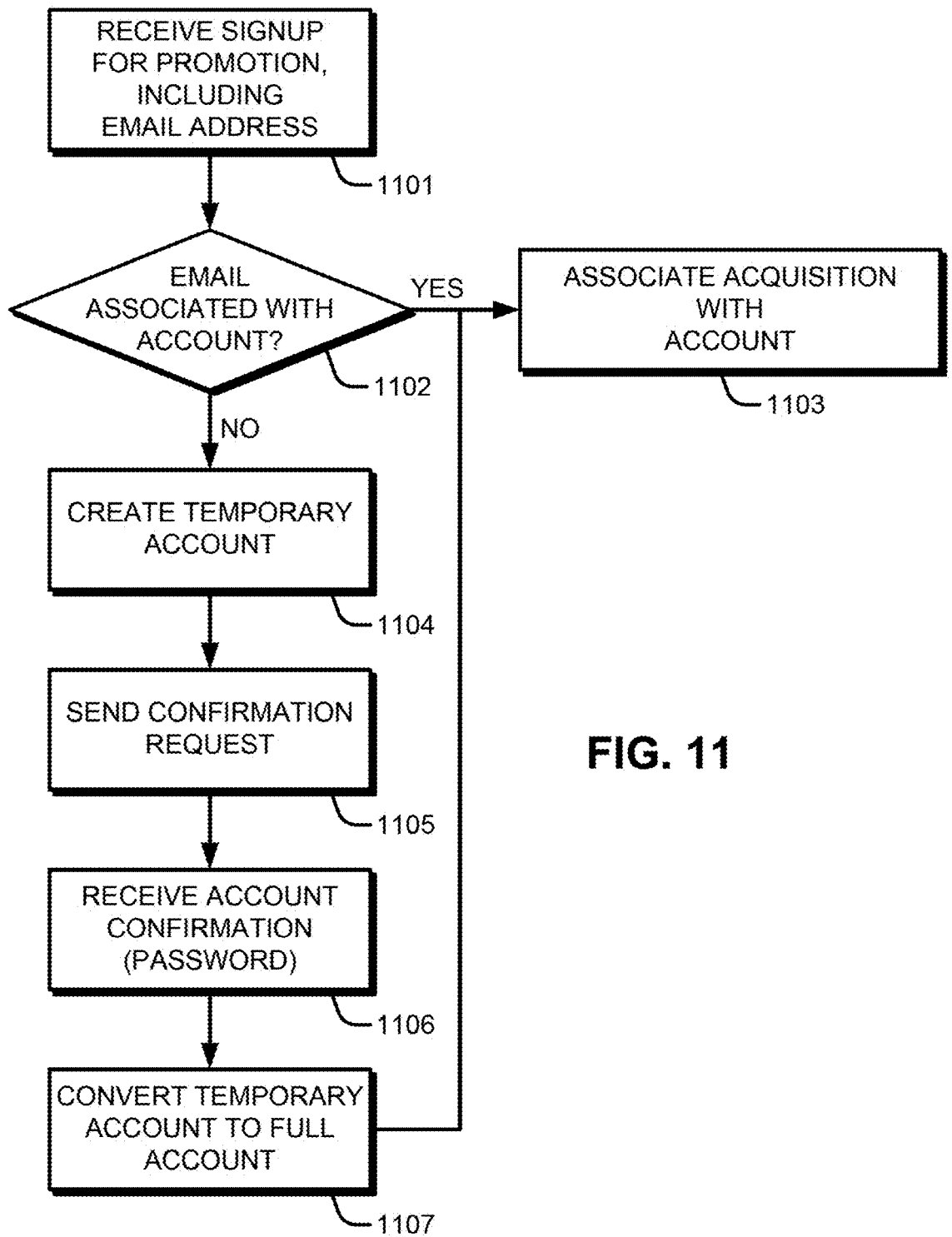
FIG. 11 is a flowchart of a process of participating in a promotion, as used in an embodiment.

FIG. 11 is a flowchart of a process of participating in a promotion, as used in an embodiment. The process may be performed, for example, at blocks 707 and 708 of FIG. 7. The process may be performed, for example, by workflow management system 101 of FIG. 1. In various embodiments, additional blocks may be included, some blocks may be removed, and/or blocks may be connected or arranged differently from what is shown.

At block 1101, the workflow management system receives sign-up information for a promotion. The sign-up information may include information such as an email address which may be used to identify the acquisition entity who is signing up for the promotion. The sign-up information may further include information such as a promotion ID, promotion information, and API key, a vendor ID, other user identifier, identifiers of products purchased, indications of amounts spent, and so on.

At block 1102, the workflow management system determines whether the received email address or other user identifier is associated with an existing account. If so, then at block 1103, the purchase made by the acquisition entity is associated with that identified account.

If the email address is not associated with an existing account, then at block 1104, a temporary account is created. The temporary account information may be stored, for example, in account database 205 of FIG. 2. The purchase may then be associated with this temporary account. Thus, the temporary account may be used to keep track of clicks by promotion reviewing entities or other transactions that entitle the acquisition entity to a rebate.

At block 1105, a confirmation request is sent to the email address associated with the temporary account. The confirmation request may provide a link to the acquisition entity enabling the acquisition entity to confirm that the email address is active and that the acquisition entity wishes to participate in the rebate promotion. The acquisition entity may then access the provided location and provide account confirmation such as a password at block 1106.

Upon receiving the account confirmation at block 1106, the workflow management system may then convert the temporary account to a full account at block 1107. The full account is then associated with the purchase, thus enabling the acquisition entity to earn rebates through the rebate promotion. In an embodiment, the temporary account is set to expire after a predetermined period, thus ensuring that inactive temporary accounts are not retained indefinitely. The predetermined period may correspond, for example, to a time limit associated with the promotion.

Figure 12:
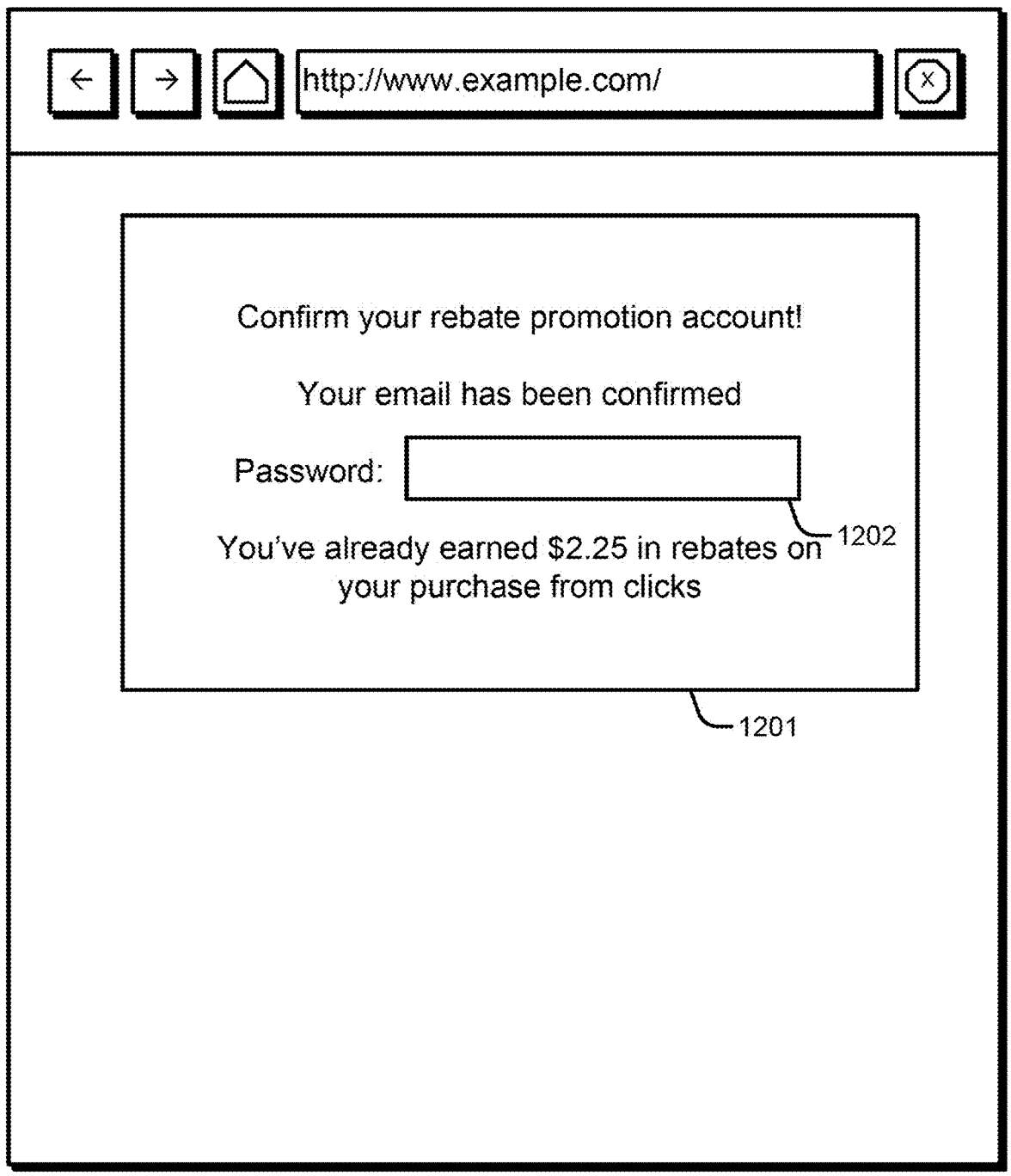
FIG. 12 is a user interface for confirming an account with the workflow management system, as used in an embodiment.

FIG. 12 is a user interface for confirming an account with the workflow management system, as used in an embodiment. The interface may be displayed, for example, at block 1106 of FIG. 11.

The interface may include box 1201 which requests the acquisition entity to confirm the created rebate promotion account. In order to confirm the account in an embodiment, the acquisition entity may provide a password in field 1202 or other appropriate information. Such confirmation may ensure that the provided email account is active and that the acquisition entity indeed wishes to participate in the rebate promotion.

The interface may further indicate a percentage or dollar amount of a rebate already earned prior to the account being confirmed. As explained with regard to FIG. 11, a temporary account may be able to track rebates earned by the acquisition entity even prior to account confirmation, and those earned rebates are transferred to the full account upon account confirmation. Such a display of the amount of rebate already earned may assist in incentivizing the acquisition entity to complete the confirmation process using an interface such as that shown in FIG. 12.

In an embodiment, if the acquisition entity does not confirm the account within a certain period of time, then communications such as email messages are sent to the acquisition entity to remind the acquisition entity of the rebate promotion and optionally to inform the acquisition entity of the amount of the rebate already earned. Such reminder emails may serve to further increase participation among acquisition entities in the rebate promotion and to avoid earned rebates from being discarded due to lack of account confirmation.

Figure 13:
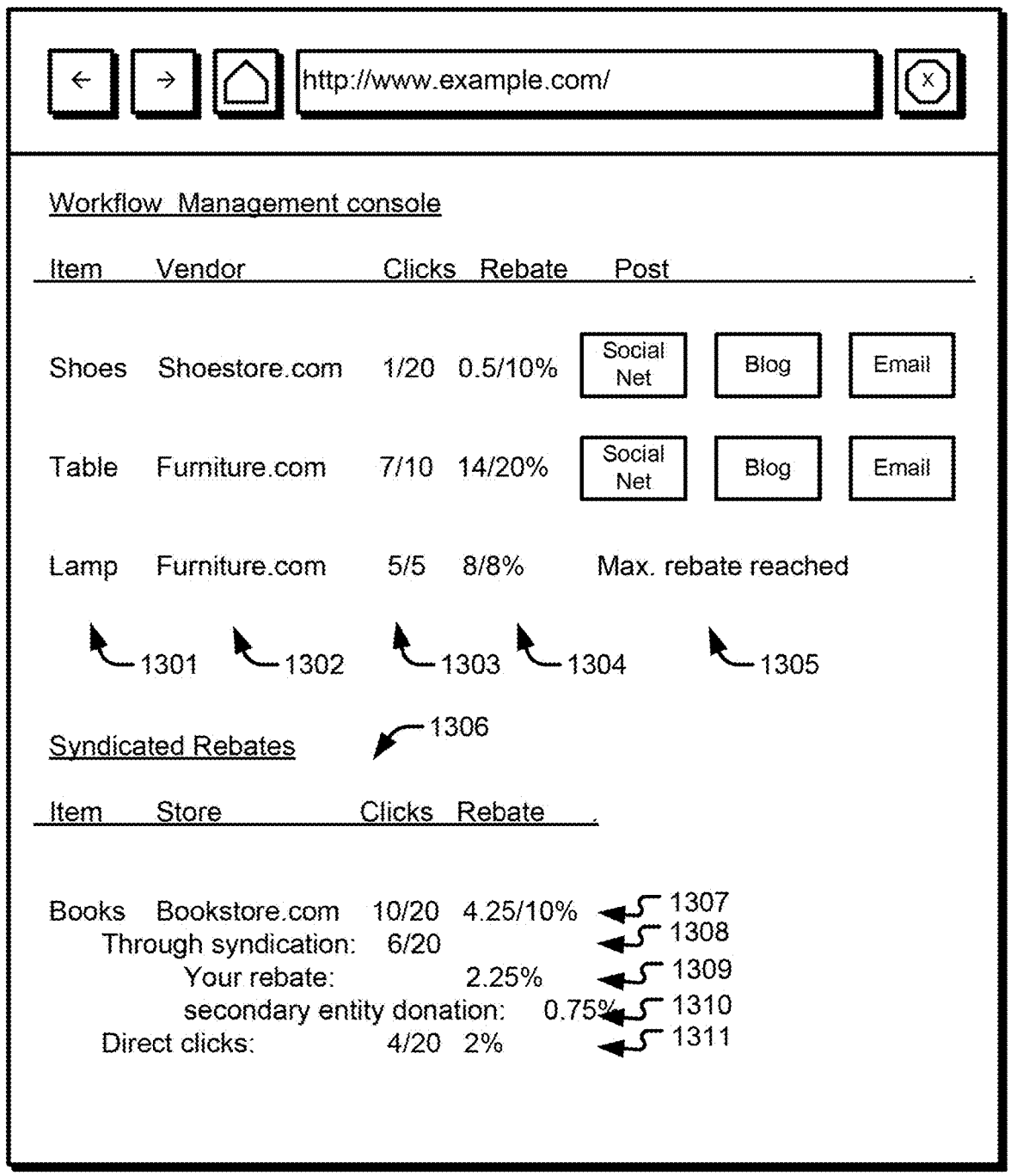
FIG. 13 is a user interface of a rebate promotion management console, as used in an embodiment.

FIG. 13 is a user interface of a rebate promotion management console, as used in an embodiment. The rebate management console may include information about ongoing rebate promotions in which an acquisition entity is participating. The acquisition entity may access the rebate management console, for example, by logging into an appropriate website operated by the workflow management system or associated system.

The rebate management console may identify information such as items purchased 1301, store or other entity from which the item was purchased 1302, number of clicks by promotion reviewing entities on information components from the acquisition entity 1303, total number of clicks available 1303, percentage of rebate earned 1304, maximum rebate percentage 1304, dollar amount earned (not shown in this embodiment), maximum rebate dollars (not shown in this embodiment), and/or other such information. The rebate management console may further include options enabling the acquisition entity to further post information components relating to particular promotions at various locations such as social networks, blogs, email messages and the like. In an embodiment, where the maximum number of clicks has been reached and/or the maximum rebate amount has been earned, the rebate management console may indicate such and/or prevent further posts of the information components from being created. In an alternate embodiment, the acquisition entity may still be able to post the information components even though the maximum rebate has been reached with the understanding that clicks by promotion reviewing entities will not earn further rebates.

The rebate management console may further include details relating to rebate syndication, in table 1306 and/or elsewhere. The syndication details may be displayed separately, as shown in FIG. 13, or those details may be incorporated with the information relating to non-syndicated rebates.

In the embodiment shown in FIG. 13, the acquisition entity has made a purchase of books and has syndicated the corresponding rebate promotion, which offered a maximum 10% rebate for 20 clicks, as shown in entry 1307. One or more distributors have posted the information components relating to this rebate promotion, and they have garnered six clicks, as shown in entry 1308. In this example, 25% of the rebate earned for those six clicks is awarded to the distributors, and the balance is awarded to the acquisition entity. Thus, entry 1309 indicates that the acquisition entity has earned a 2.25% rebate, and entry 1310 indicates that the distributors have been awarded a 0.75% rebate.

Different information may be displayed in various embodiments. For example, the identities of particular distributors may be displayed or hidden, possibly for privacy concerns. The cash value of rebates may be displayed, rather than percentages. The posting options 1305 may be included.

The acquisition entity may also earn rebates by posting information components directly, rather than through a distributor, and receiving clicks on those directly posted information components. Thus, entry 1311 shows, following the above example, that there have been four clicks on information components directly posted by the acquisition entity, earning the acquisition entity a 2% rebate. The revenue may be entirely allocated to the acquisition entity since the clicked information components were directly posted by the acquisition entity.

It is noted that information components may be "directly posted" by an acquisition entity even though those information components may be linked, reposted, or otherwise redistributed by third parties. For example, an acquisition entity may post information components on a social network, and the acquisition entity's friends may repost those materials on other social networks. In an embodiment, clicks on the reposted materials are credited to the acquisition entity, so that the friends are not considered distributors and are not allocated a share of the rebate. This may be because the reposted materials include a unique identifier, such as a link URL, associated with the originally posted information components. In other embodiments, the third parties who redistribute information components may be awarded a share of the rebate and/or an additional rebate.

Figure 14:
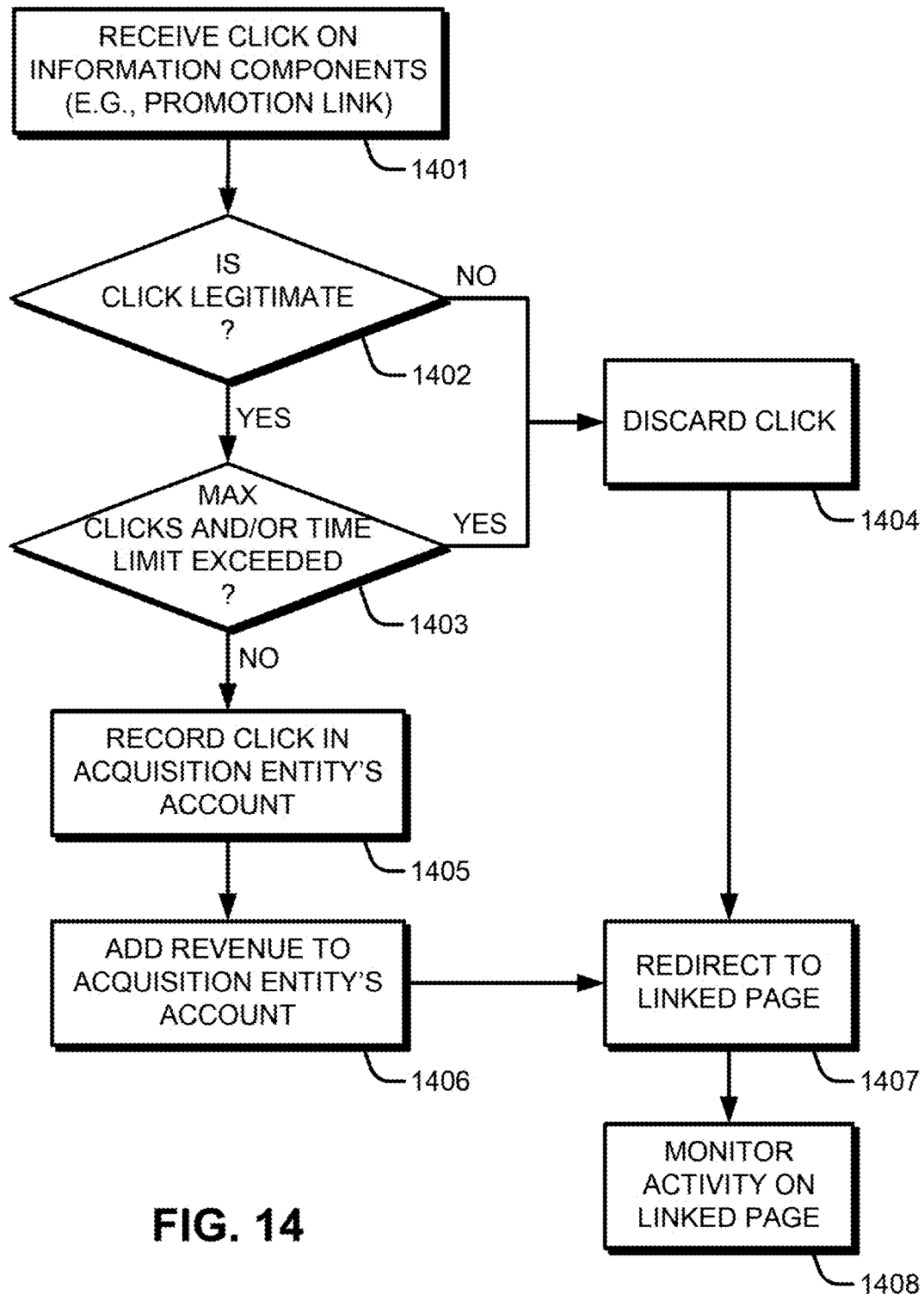
FIG. 14 is a flowchart of a process of handling clicks on information components as used in an embodiment.

FIG. 14 is a flowchart of a process of handling clicks on information components as used in an embodiment. The process may be performed, for example, at blocks 304 and 305 of FIG. 3, and blocks 404 and 405 of FIG. 4. The process may be performed, for example, by workflow management system 101 of FIG. 1. In various embodiments, additional blocks may be included, some blocks may be removed, and/or blocks may be connected or arranged differently from what is shown.

At block 1401, the workflow management system receives a click on a link in information components. The click may be received, for example, through an HTTP and/or other request directed to the workflow management system and/or an associated computer system. In various embodiments, other activities other than clicks on information components may be monitored such as product purchases, video views, survey completions, and so on.

In an embodiment, the workflow management system may determine information based on the click received at block 1401. Such information may include, for example, the identity of the vendor acquisition entity and/or rebate promotion associated with the click. In an embodiment, the determination of any one or more of these identities may be made based on information included with the click such as URL query parameters. In an embodiment, the information may be determined based on the URL of the request made by the click. The URL may be associated within the workflow management system with a database record identifying the rebate promotion, the vendor, and/or the acquisition entity. Based on this information, the workflow management system may credit the appropriate acquisition entity for the click.

At block 1402, the workflow management system may determine whether or not the click or other transaction is legitimate. Such a determination may be made using various information about the click such as the timing of the click, the address from which the click originated, the relation of the click to other clicks, and so on. The determination may be made using a variety of techniques such as statistical modeling, Bayesian analysis, spam filtering, behavioral analysis, and so on. If the click is not legitimate, then at block 1404, it may be discarded. In an embodiment, the determination of whether or not a click is legitimate may be made at a later time such as on a periodic basis. In such a case, rebates may be retracted as a result of a later determination that a click is not legitimate. In an alternate embodiment, clicks may be held in a pending state until the determination has been made. In some embodiments, records may be kept of clicks that are discarded or not considered legitimate, along with one or more reasons as to why the click was not considered to be legitimate. A variety of rules or criteria may be used to determine that a click is illegitimate. For example, when a click is received, attributes such as a source of the click (e.g., an IP address, domain, and/or geographical location), a browser associated with the click, a time of the click, and/or the like, may be determined. These attributes or combinations of attributes may be used to determine whether or not a click is legitimate.

In some embodiments, the source of the click may be checked against a blacklist containing known sources of illegitimate clicks, wherein the click will be considered illegitimate if the source is found on the blacklist. In some embodiments, the relation of the click to other clicks may also be considered. For example, if a large number of clicks are received within a relatively short time period, the clicks may be considered to be illegitimate. In some embodiments, these clicks may be required to originate from the same source or similar sources in order to be determined illegitimate. In some embodiments, additional clicks originating from sources that have already clicked on the information components may be considered illegitimate for rebate promotion purposes.

At block 1403, the workflow management system determines whether a maximum number of clicks for the promotion has been exceeded. For example, if a rebate promotion specifies that an acquisition entity may earn rebates for up to 20 clicks, then the workflow management system may determine at block 1403 whether the acquisition entity associated with a particular click has already been credited for that number of clicks on the information components. Additionally or alternatively, the workflow management system may further conduct other tests to determine whether or not the click should result in the acquisition entity being credited with a rebate. For example, the workflow management system may determine whether a time limit for the promotion has expired. If the conditions are not met, then at block 1404, the click may be discarded.

At block 1405, the workflow management system records the click in the acquisition entity's account. At block 1406, the appropriate revenue is calculated and added to the acquisition entity's account. The calculation of the revenue to be added may be based on the appropriate rebate parameters or other promotion data as shown in FIG. 6.

In an embodiment, the amount of revenue added to the acquisition entity's account is based on the promotion data for the appropriate rebate promotion and, in particular, based on a linear interpolation calculated from the maximum rebate and the number of clicks associated with the promotion. For example, the revenue added to the acquisition entity's account may be calculated based on the maximum rebate percentage for the promotion divided by the number of clicks and multiplied by the purchase amount.

In various embodiments, depending on the particular rebate promotion, other methods of calculation may be used. For example, a nonlinear rebate scheme such as a quadratic rebate scheme may be used so that earlier clicks earn smaller revenue while later clicks earn greater revenue. Alternately, a scheme such as a logarithmic scheme may be used so that earlier clicks earn more revenue while later clicks earn less revenue. Regardless of the form of calculation, the rebate amount may be calibrated such that the total rebate does not exceed the maximum rebate.

At block 1406 the workflow management system may further determine whether the click received at block 1401 originated from syndicated information components. The workflow management system may make this determination, and further determine the identity of the distributor who distributed the syndicated information components, based on the URL query parameters and/or other information as described above. If the click did originate from a distributor, then the workflow management system may allocate revenue (e.g., may partition a maximum value increment) between the acquisition entity and the secondary entity based on the revenue sharing scheme (e.g., a partition parameter) for syndication of the rebate promotion.

In an embodiment, regardless of whether or not the click is discarded or credited to the acquisition entity's account, the workflow management system redirects the reviewing entity who initially clicked on the information components to a linked page. The linked page may be defined as part of the promotion data and may direct the reviewing entity to the vendor or to another appropriate location. The redirect may be performed using an HTTP redirect message such as a 30×HTTP response. In an alternate embodiment, rather than redirecting the reviewing entity to a linked page, the workflow management system may respond to the reviewing entity by directly sending content associated with the rebate promotion.

At block 1408, the workflow management system optionally monitors activity on the linked page or other content to which the reviewing entity was directed at block 1407. In an embodiment, the activity monitoring is performed using client side and/or server side code included on the vendor's site or other site appropriate for the linked page. Such activity monitoring may provide statistics and/or other information indicative of the effectiveness of the rebate promotion and/or advertising campaigns which may be collected by the workflow management system to be provided to the vendor and/or other appropriate entity immediately and/or at a later time.

Figure 15:
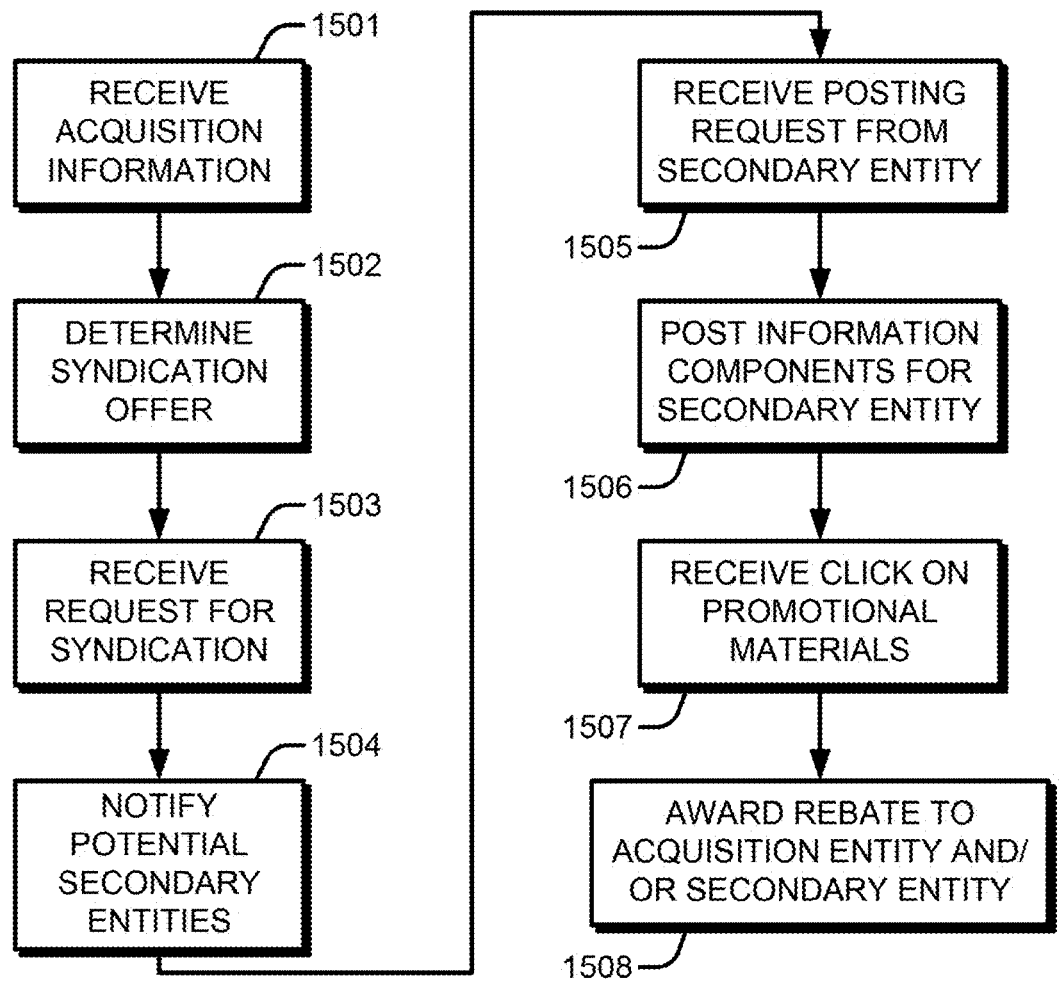
FIG. 15 is a flowchart of a process of syndicating a rebate promotion, as used in an embodiment.

FIG. 15 is a flowchart of a process of syndicating a rebate promotion, as used in an embodiment. The process may be performed, for example, by workflow management system 101 of FIG. 1. The process may be performed as part or all of the processes described with respect to FIGS. 3-4. In various embodiments, additional blocks may be included, some blocks may be removed, and/or blocks may be connected or arranged differently from what is shown.

In one embodiment, a method of managing distribution of information components (e.g., promotional materials or the like, as discussed herein) among multiple network accessible databases (e.g., social media sites or the like, as discussed herein) and by multiple entities (e.g., a purchaser, a previous purchaser, a distributor, or the like, as discussed herein) comprises creating an association in a management database (e.g., in a promotion instance data item such as in FIG. 16, or any other association stored in the promotion database 204, account database 205, or other data structure) between an acquisition entity record (e.g., a purchaser account record) and an acquisition from a vendor (e.g., a purchase from a merchant), wherein the association is created by the workflow management computer. In one embodiment, the method includes determining, by the workflow management computer system, a maximum value increment (e.g., a maximum rebate) amount determined based on the acquisition, wherein the maximum value increment is partitionable between the acquisition entity and one or more secondary entities (e.g., the maximum rebate is eligible to be split between purchaser and one or more distributors). In some embodiments, the workflow management system evaluates a secondary entity selection model (e.g., distributor selection criteria, rules, models, or the like, as discussed herein), by the workflow management computer system, to identify one or more secondary entities (e.g., distributors of the promotional material or the like, as discussed herein) by: parsing the management database to identify a set of previous acquisition entities associated with the vendor (e.g., identifying previous purchasers from the vendor), parsing the management database to determine a first subset of the set of previous acquisition entities that were previously associated with a value increment (e.g., identifying previous purchasers that were awarded a rebate based on those previous purchases), and evaluating parameters in the management database of each of the first subset of previous acquisition entities according to one or more criteria of the secondary entity selection model (e.g., applying distributor selection rules). In some embodiments, the one or more criteria may include one or more of: a raw number of clicks on information components shared by the previous acquisition entity in connection with a previously claimed value increment (e.g., clicks on promotional material), a ratio of a number of legitimate clicks and the raw number of clicks, a value increment per click associated with previously shared information components by the previous acquisition entity in connection with the previously claimed value increment (e.g., a rebate per click for a previous purchase), or a total amount of value increments outstanding associated with the previous acquisition entity (e.g., a total rebate amount outstanding to the previous purchasers/potential distributor). In some embodiments, the workflow management system, based on the evaluation, designates one or more of the previous acquisition entities of the first subset of previous acquisition entities as the one or more secondary entities (e.g., identifies distributor(s) for the purchase). In some embodiments, the workflow management computer system determines a value increment per click assigned to each of a predetermined quantity of clicks on first information components shared by the acquisition entity by respective reviewing entities (e.g., a "rebate-per-click" or the like, as discussed herein) and a fractional relationship indicating a first portion of the value increment per click associated with the acquisition entity and a second portion of the value increment per click associated with respective secondary entities in response to respective clicks on second information components shared by respective secondary entities by reviewing entities (a rebate allocation between the purchaser and the distributor). In some embodiments, the workflow management computer system receives indications that a viewing entity has clicked on second information components posted by a first secondary entity (e.g., promotional information posted by a distributor), and, in response to determining that the maximum value increment amount has not been reached (e.g., the maximum rebate about has not been reached), based on the fractional relationship (e.g., the rebate allocation), incrementing a value parameter of the acquisition entity record in the management database the first portion of the value increment per click (e.g., awarding a monetary partial rebate to the purchaser's account), and incrementing a value parameter of a first secondary entity record in the management database the second portion of the value increment per click (e.g., awarding a monetary partial rebate to the distributor's account).

With reference to the specific example of FIG. 15, at block 1501, the system receives purchase information relating to a purchase from a vendor eligible for a rebate promotion. This process may be that previously described with respect to block 402 of FIG. 4, for example. The associated rebate promotion may permit for syndication of the rebate promotion, so that parties other than the acquisition entity, such as distributors 107 of FIG. 1, may post information components and receive portions of the associated rebate.

At block 1502, the system determines a syndication offer, which may be included as part of the rebate promotion offer. The syndication offer may include a percentage of the rebate that will be given to distributors who successfully distribute the information components and receive clicks on those information components. The syndication offer may be a fixed percentage set by the system, such as 25%, and/or a percentage chosen by the vendor offering the rebate promotion. As described previously, the rebate sharing scheme may involve calculations other than a fixed percentage allocation. The acquisition entity may then be informed as to the syndication offer, through a user interface, email, and/or other communication.

The acquisition entity may then accept the syndication offer or otherwise request syndication at block 1503. The request for syndication may be recorded in the acquisition entity's account, which may be a temporary account as described above. At block 1504, potential distributors may be notified of the syndication of the rebate promotion by the acquisition entity, so that those potential distributors may post the appropriate information components.

The potential distributors at block 1504 may be limited in various ways. In an embodiment, a distributor of a particular syndicated rebate promotion must have previously purchased the same product as the acquisition entity. Alternately, distributors may be limited to those who previously purchased similar products, who purchased products from the same vendor, who purchased products within the same rebate promotion, and/or the like. Such limitations may ensure that the distributors of syndicated information components have appropriate connections to the rebate promotion, providing the credibility enhancements described previously. The system may also limit distributors based on selections by the acquisition entity, reputations of the distributors (as calculated, for example, by past information components posting history), demographic and/or personal factors (for example, distributors similar to the acquisition entity), and so on. Some example methods and parameters for determining potential distributors are described in additional detail below, FIGS. 19-26.

Potential distributors may be notified at block 1504 by various mechanisms. In one embodiment, the system may provide a distributor with a user interface such as a web page or mobile device content, identifying syndicated rebate promotions available to the distributor. The potential distributors may additionally or alternatively be notified by push notifications, emails, text messages, mobile application notifications, and the like. The system may selectively notify distributors of, and/or display to distributors, available syndicated rebate promotions based on the distributor limitations described previously, so that only those distributors eligible to participate in the syndicated rebate promotion are made aware of the promotion.

At block 1505, the system receives a request from a distributor to post syndicated information components. The request may be, for example, a request to post the information components on a social networking site or other site, a request to email or message others with the information components, and/or other type of request. The requests may be analogous to those made by acquisition entities who wish to post information components directly, and they may be made on a user interface similar to that shown at interface elements 1002 in FIG. 10.

In response, the system may then post the syndicated information components for the distributor, at block 1506. The posting process may be similar to that described with respect to interface elements 1002. As described previously, the posted materials may include an identifier, such as a URL query parameter, to associate the posted materials with the acquisition entity and/or the rebate promotion. In the case that the information components are syndicated and posted by a distributor rather than by the acquisition entity, the identifier may further be associated with the distributor, so that the distributor may be appropriately identified and credited when reviewing entities interact with the information components. The system may additionally or alternatively make information components directly available to distributors and/or other entities, so that those entities may post the information components directly rather than requesting the system to do so at block 1505.

At block 1507, the system detects a click or other appropriate interaction with the information components posted at block 1506. In response, the system may identify the acquisition entity, rebate promotion, and/or distributor associated with the information components, and the acquisition entity and/or distributor may be credited with a partial or full rebate at block 1508. The process of detecting the interaction and crediting accounts may be similar to that described previously with respect to FIG. 14.

Figure 16:
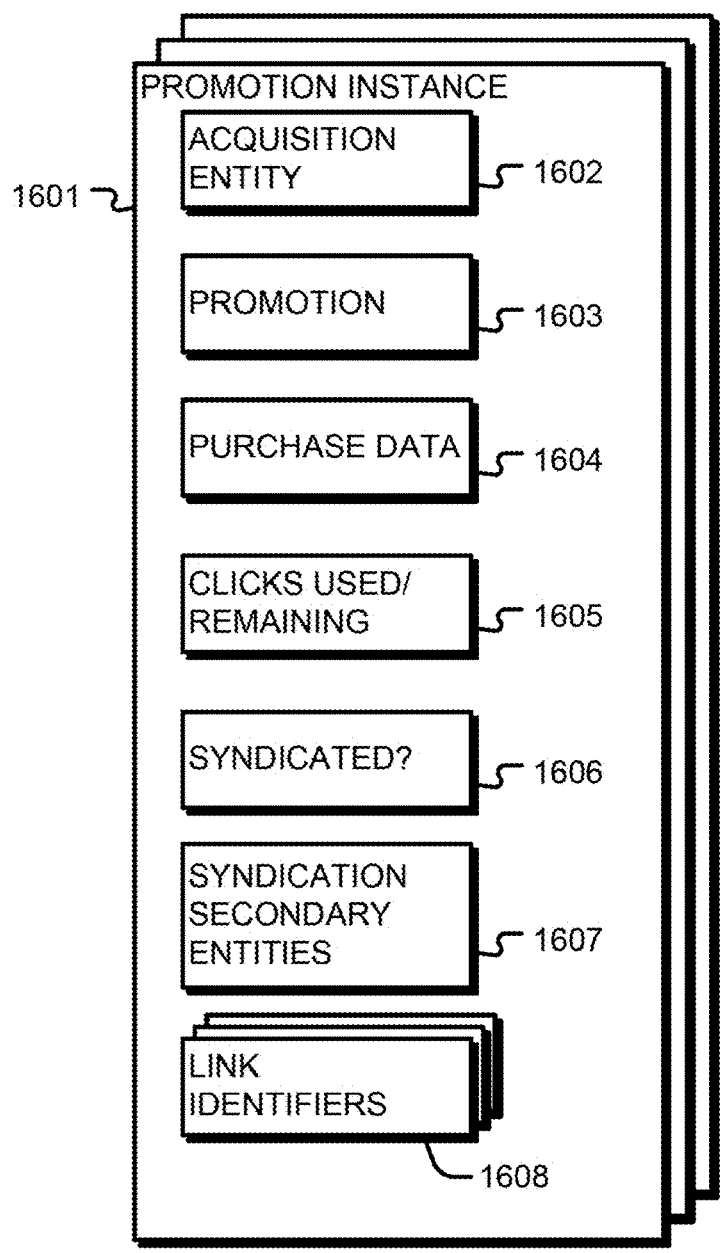
FIG. 16 is a block diagram of a data structure of a promotion instance, as used in an embodiment.

FIG. 16 is a block diagram of a data structure of a promotion instance, as used in an embodiment. A "promotion instance" may be a representation of a particular instance of a rebate promotion in which an acquisition entity is engaged. The promotion instance data may be created and/or stored, for example, at the time that an acquisition entity agrees to participate in a rebate promotion, and the data may maintain the status of that acquisition entity's participation in the promotion. The data structure may be stored on computer-readable media such as a hard drive, SSD, tape backup, distributed storage, cloud storage, and so on, and may be structured as relational database tables, flat files, C structures, programming language objects, database objects, and the like. In various embodiments, additional elements may be included, some elements may be removed, and/or elements may be arranged differently from what is shown.

Promotion instance 1601 may include references to an acquisition entity account 1602 and a rebate promotion 1603, the latter of which may reference a data structure such as that shown in FIG. 6. The reference to the acquisition entity account 1602 may be a reference to a temporary or permanent account, as described above. The promotion instance 1601 may further include purchase data 1604, which may include the items purchased, the purchase amount, the rebate-eligible purchase amount, the maximum rebate amount, and the like. The reference to the rebate promotion 1603 and/or the purchase data 1604 may be used to calculate the awarded rebate amounts.

In an embodiment, rebate promotion data 1603 may be copied into promotion instance data 1601 rather than being linked or referenced, so that changes to the overall rebate promotion parameters do not affect promotion instances that are ongoing. For example, an acquisition entity may be offered a 10% rebate, and subsequently the vendor may change the rebate promotion to only offer a 5% rebate, so the original 10% rebate value may be copied into the acquisition entity's promotion instance data so that the acquisition entity continues to receive the original 10% rebate. In alternate embodiments, the rebate offered to the acquisition entity may be changed after the fact, or rebate promotions may be made unalterable (so that the vendor would have to discontinue the 10% promotion and create a new 5% promotion in order to achieve the above change).

Promotion instance data 1601 may also include records 1605 of clicks or other interactions with promotional data. These records may be used to determine the partial rebate to be awarded the acquisition entity. The records may include a count of clicks or other interactions, and/or they may include specific information about each click or interaction. The latter form of records may enable determinations of legitimacy of clicks, for example.

As described previously, the acquisition entity may, in an embodiment, be given the option to syndicate a particular rebate promotion. If the acquisition entity chooses to syndicate, this choice may be stored in the acquisition entity's promotion instance data 1601, for example in flag 1606. Thus, in an embodiment, some acquisition entities may choose to syndicate, while other acquisition entities may choose not to syndicate, perhaps because those acquisition entities are more confident in their abilities to generate clicks or other transactions.

The promotion instance data 1601 may optionally include indications or references to syndication distributors 1607. This may be used to identify rules for selection of permitted secondary entities ("distributors") and/or indications of specific permitted (or not permitted) distributors of syndicated information components, as identified by the system and/or selected by the acquisition entity. Alternately, the system may determine permitted distributors automatically, so that the list of permitted distributors need not be stored in promotion instance data 1601. The promotion instance data may further identify those distributors who have generated successful clicks or interactions by posting syndicated information components, so that those distributors may be credited appropriately.

Promotion instance data 1601 may further include link identifiers 1608 and/or other identifiers. These identifiers may be correlated or otherwise associated with identifiers in information components, such as URL query parameters and/or short URL links, so that clicks or interactions with those posted information components can be traced back to the promotion instance and then to the acquisition entity and rebate promotion. In the case that an acquisition entity chooses to syndicate a rebate promotion, multiple identifiers 1608 may be included, so that the distributors posting syndicated information components may be differentiated when those syndicated information components are clicked or otherwise interacted with.

Figure 17:
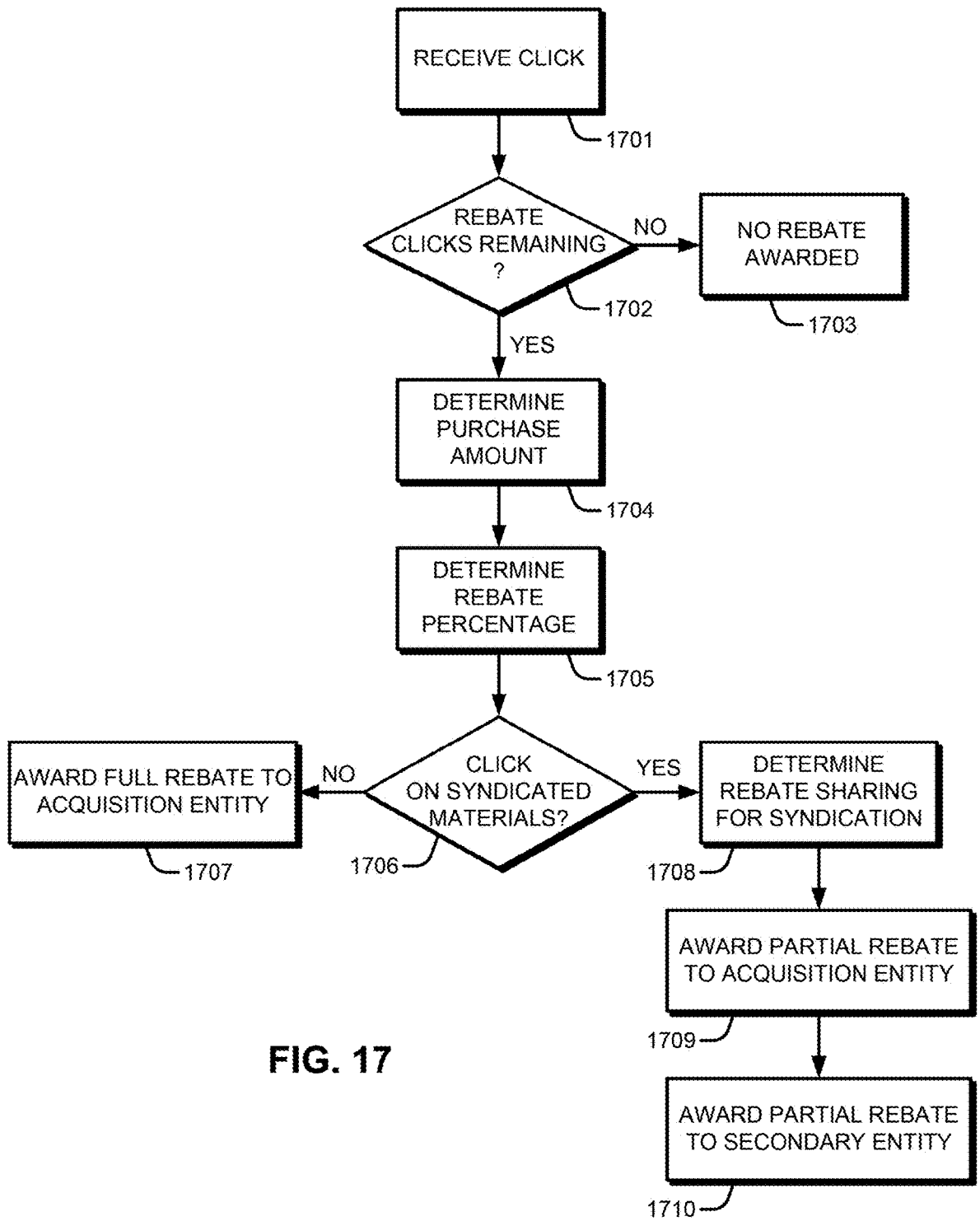
FIG. 17 is a flowchart of a process of allocating rebates, as used in an embodiment.

FIG. 17 is a flowchart of a process of allocating rebates, as used in an embodiment. The process may be used, for example, within the process described with respect to FIG. 14. The process may be performed, for example, by workflow management system 101 of FIG. 1. In various embodiments, additional blocks may be included, some blocks may be removed, and/or blocks may be connected or arranged differently from what is shown.

At block 1701, the system detects a click or other interaction with information components. The system may then determine whether there are remaining rebate-eligible clicks for the promotion instance associated with the clicked information components. The determination may be based on, for example, data element 1605 of FIG. 16. The determination may be similar to (and part or all of) the process described with respect to block 1403 of FIG. 14. If no eligible clicks remain, then at block 1703 no rebate is awarded.

At block 1074 and 1705, the system determines the purchase amount and rebate percentage, as well as other parameters as needed to calculate the rebate to be awarded for the detected click or interaction. The calculation may be similar to that described with respect to block 1406 of FIG. 14.

At block 1706, the system then may determine whether the click or interaction detected at block 1701 was associated with information components that were syndicated and posted by a secondary entity rather than the acquisition entity. If the information components were posted by the acquisition entity, then at block 1707 the acquisition entity is awarded the full rebate due for the detected click or interaction.

If, on the other hand, the system determines that the click or interaction was on information components posted by a secondary entity, then at block 1708 the system may assess a rebate due to both the original acquisition entity and the secondary entity. In an embodiment, at block 1708, the system determines the overall rebate to be awarded for the click or interaction (for example, based on the purchase price, number of clicks, maximum rebate percentage, and so on) as described previously, and then the system allocates the calculated rebate amount between the distributor and the acquisition entity based on a rebate sharing percentage or formula, as described previously with respect to syndication parameters 609 of FIG. 6. The calculated rebates may then be awarded to the acquisition entity and distributor at blocks 1709 and 1710.

Selecting Potential Distributors

As stated above, various methods may be used when determining potential secondary entities to use when syndicating a rebate promotion. For example, selection of secondary entities is mentioned above in reference to FIG. 15. In some embodiments, potential distributors comprise customers or acquisition entities who have participated in rebate promotions in the past. It may be found that different participants of past rebate promotions may have had different success rates when sharing information components, measured by various factors such as number of clicks resulting from shares, number of legitimate clicks, ratio of total number of clicks to number of legitimate clicks, etc. In addition, different participants may be associated with different costs (e.g., price per share or price per click that the potential distributors are willing to accept). Thus, when selecting potential distributors, it is often desired to be able to select potential distributors with the most optimized balance between cost and sharing effectiveness.

FIG. 18 illustrates a table containing data associated with acquisition entities that have participated in a rebate promotion, and that may be identified as potential distributors for future rebate promotions, in accordance with some embodiments. The table, which may be part of a management databases maintained by the workflow management system 101, contains data for a plurality of acquisition entities, including a first acquisition entity 1802, second acquisition entity 1804, third acquisition entity 1806, and fourth acquisition entity 1808 that have participated in a rebate promotion (e.g., the 8% furniture.com rebate illustrated in FIG. 13 at 1304). The various data included in the example of FIG. 18 may be used in selecting a distributor for a particular rebate syndication, such as discussed with reference to the figures below. For example, in some embodiments the initial qualification criteria for potential distributors is that the individual (or other entity) must have previously purchased a product from the vendor/advertiser that is providing the rebate promotion. In some embodiments, potential distributors are not required to purchase the same product or even a similar product, but are only required to have made a purchase at the vendor/advertiser that is providing the particular rebate promotion for which distributors are being identified. In other embodiments, other rules for previous purchase requirements may be used to initially identify potential distributors for a particular rebate promotion.

In some embodiments, data associated with each rebate promotion may be stored with a different table or data structure, while in other embodiments, data for different rebate promotions may be combined in a single table or data structure. In addition, in some embodiments data for an acquisition entity that has participated in multiple rebate promotions may be combined or aggregated to form an overall data profile for that acquisition entity.

The data for the acquisition entities may be organized as a plurality of columns (e.g., columns 1810-1828). It is understood that the particular columns of the illustrated table are shown for purpose of example, and that in other embodiments, different columns corresponding to different types of data, or different combinations of columns, may be used instead. In addition, in some embodiments, acquisition entity data may be organized or displayed using other formats or data structures. For example, a columnar data structure, such as is illustrated in FIG. 18, may be referred to generally as a "database," which may refer to a database (e.g., RDBMS or SQL database), or may refer to any other data structure, such as, for example a comma separated values (CSV), eXtendible markup language (XML), TeXT (TXT) file, flat file, spreadsheet file, and/or any other widely used or proprietary format.

Column 1810 comprises data identifying the particular acquisition entity. In the illustrated figure, each acquisition entity is identified using an email address. In some embodiments, other information (e.g., an acquisition entity ID) may be used to identify the acquisition entity. In addition, other acquisition entity data, such as acquisition entity name, type (e.g., individual or corporate), location, etc. may also be stored and associated with an acquisition entity. In some embodiments, the identifier (e.g., email address or acquisition entity ID) may be used to access additional acquisition entity data that is stored in a separate acquisition entity table or data structure.

At column 1812, the vendor or advertiser that the acquisition entity has purchased from, and is associated with the rebate promotion for, is specified. In some embodiments, only acquisition entities that have participated in a rebate promotion before can be considered eligible for being a potential distributor for future syndicated rebate promotions. In some embodiments, additional information, such as the specific product(s) purchased from the vendor, quantity of product purchased, purchase price, and/or the like may also be used as requirements for consideration as a distributor.

At column 1814, an indication by be given as to a current status of the rebate promotion with regards to the particular acquisition entity. For example, a status of "paid" indicates that a particular acquisition entity has been fully paid with regards to a rebate promotion that they have participated in. On the other hand, an "active" status may indicate that the acquisition entity has not yet received a full payment for the rebate promotion. In other embodiments, different types of statuses may be used. For example, in some embodiments a status may indicate that a time period during which clicks may be counted for purposes of the rebate promotion has not yet expired, that the time period has not yet expired but that a maximum number of clicks has already been reached, that the time period has expired but a full payment has not yet been rendered, and/or the like.

At column 1816, data on a number of clicks associated with a rebate promotion that the acquisition entity has participated in may be indicated. For example, a total number of clicks may be counted and displayed next to a total number of legitimate clicks (e.g., as determined at block 1402 in FIG. 14) to form a "total clicks ratio." For example, with reference to customer 1802, the total number of clicks is indicated as "9", while the number of legitimate clicks (of those 9 clicks) is only "5". This information regarding total clicks and legitimate clicks may then be used to calculate "a gross click purity" at column 1818, which may be calculated as a percentage of legitimate clicks to total clicks. For example, first acquisition entity 1802 had 9 total clicks as a result of his or her sharing associated with the rebate promotion, with 5 of those clicks being determined to be legitimate, and thus has a gross click purity of 55.56% (legitimate clicks divided by total clicks=5/9=55.56%). On the other hand, second acquisition entity 1804 had a total of 22 clicks as a result of his or her sharing, but with only 6 of those clicks being considered legitimate, a gross click purity is only 27.27% (6/22=27.27%). In some embodiments, click-related data for the acquisition entity may be divided between one or more different subcategories, such as social network or sharing channel. For example, a particular acquisition entity may share information components for the rebate promotion on Facebook and on a blog. Click data for the information components shared through each channel may be tracked separately and displayed in separate columns or rows in the table.

In some embodiments, a rebate promotion defines multiple actions that result in payments to a distributor. For example, a particular rebate promotion may provide an initial payment to an acquisition entity (also referred to as an incentive, illustrated at column 1820) when the acquisition entity initially shares information components associated with the rebate promotion on a social network, as well as a click value indicating a payment for each click that results from the shared material (illustrated at column 1822). In some embodiments, the incentive will only be paid if the acquisition entity shared the information components publically on a social network (e.g., a public Facebook post or a public blog post). On the other hand, if the acquisition entity chooses to not share information components associated with the rebate promotion publically (e.g., through a private post on a social network only viewable by friends or connections of the acquisition entity on the social network), then the acquisition entity does not receive the incentive amount, but may still receive click value from clicks resulting from the shared material.

A rebate promotion may also be associated with a total rebate amount (illustrated at column 1824), specifying a maximum rebate amount that can be obtained by the acquisition entity. In some embodiments, the total rebate amount for a rebate promotion corresponds to a sum of the incentive for the rebate promotion (e.g., paid to the distributor when the information components are initially posted, perhaps in accordance with defined posting requirements) and the click value of the promotion (e.g., amount paid for each legitimate click) times a maximum number of allowed clicks. For example, the calculation may be expressed as:

Total available rebate amount=total incentive+(click value×maximum clicks).

In some embodiments, if a rebate promotion time period has completed (e.g., reached the maximum number of allowed clicks for the promotion) or expired (e.g., the time period for which to receive clicks has expired), the total rebate amount for the promotion may simply be the rebate amount earned by the acquisition entity at the time of completion or expiration.

In addition, it is understood that in other embodiments, different methods for calculating a total rebate amount may be used. For example, other factors, such as purchase conversions, may also be included when calculating a total rebate amount. A particular rebate promotion may specify that if an individual or entity clicks on an acquisition entity's shared material, and then makes a purchase, the acquisition entity will receive an additional rebate. This may be a fixed or flat amount, based upon an amount of the purchase, based upon an amount of the acquisition entity's own previous purchase, and/or the like. In some embodiments, a purchase or order can be associated with a click by tracking an IP address, user agent, and/or API key associated with the click, and matching it to a subsequent order that occurs within a specified time period of the click.

In some embodiments, incentive, click value, and/or total rebate may be determined as a portion or percentage of purchase price. For example, if an acquisition entity purchased $1000 in goods from a vendor, and the rebate promotion specifies a share incentive of 2% and an additional 1% rebate per click for up to 8 clicks (for a total potential of up to 10% of the purchase price), then the total incentive for the acquisition entity would be $20, and the click value would be $10/click for a total click value (if all 8 clicks are received) of $80.

At column 1826, an earning amount for an acquisition entity is displayed, corresponding to a total monetary amount that the acquisition entity has earned through the rebate promotion thus far. In some embodiments, the earnings amount is calculated as the total incentive (if earned) added to the click value times the current number of legitimate clicks. For example:

earnings=total incentive+(click value×legitimate clicks)

Thus, using the above formula on the data illustrated in FIG. 18, first acquisition entity 1802 has an incentive of $10.89 and 5 legitimate clicks at a click rate of $6.53 per legitimate click, resulting in total earnings of $43.58. On the other hand, third acquisition entity 1806 had an incentive of $3.65 but no legitimate clicks, resulting in total earnings of $3.65.

In other embodiments, earnings may be calculated in other ways. For example, as mentioned above, additional factors such as purchase conversions may also be considered when calculating an acquisition entity's earnings for a particular rebate. Different vendors or vendors may wish to implement rebates in different ways, in order to meet their individual needs and requirements.

At column 1828, a remaining rebate value is displayed, corresponding to a potential monetary value that the acquisition entity has yet to earn (assuming the promotion period has not ended or the distributor is otherwise ineligible to receive additional payments for the rebate promotion). In some embodiments, this may be calculated as the difference between the rebate amount (column 1824) and the earnings amount (column 1826), such as using the formula:

remaining rebate=rebate amount−earnings

While FIG. 18 illustrates a table of acquisition entities associated with a particular rebate promotion, it is understood that in other embodiments the table may contain data for multiple rebate promotions. In some embodiments, a single acquisition entity may have participated in multiple rebate promotions. Data for the purchase may be stored as multiple rows (e.g., one for each rebate promotion participated in) and/or aggregated or combined into a single table row.

Figure 19:
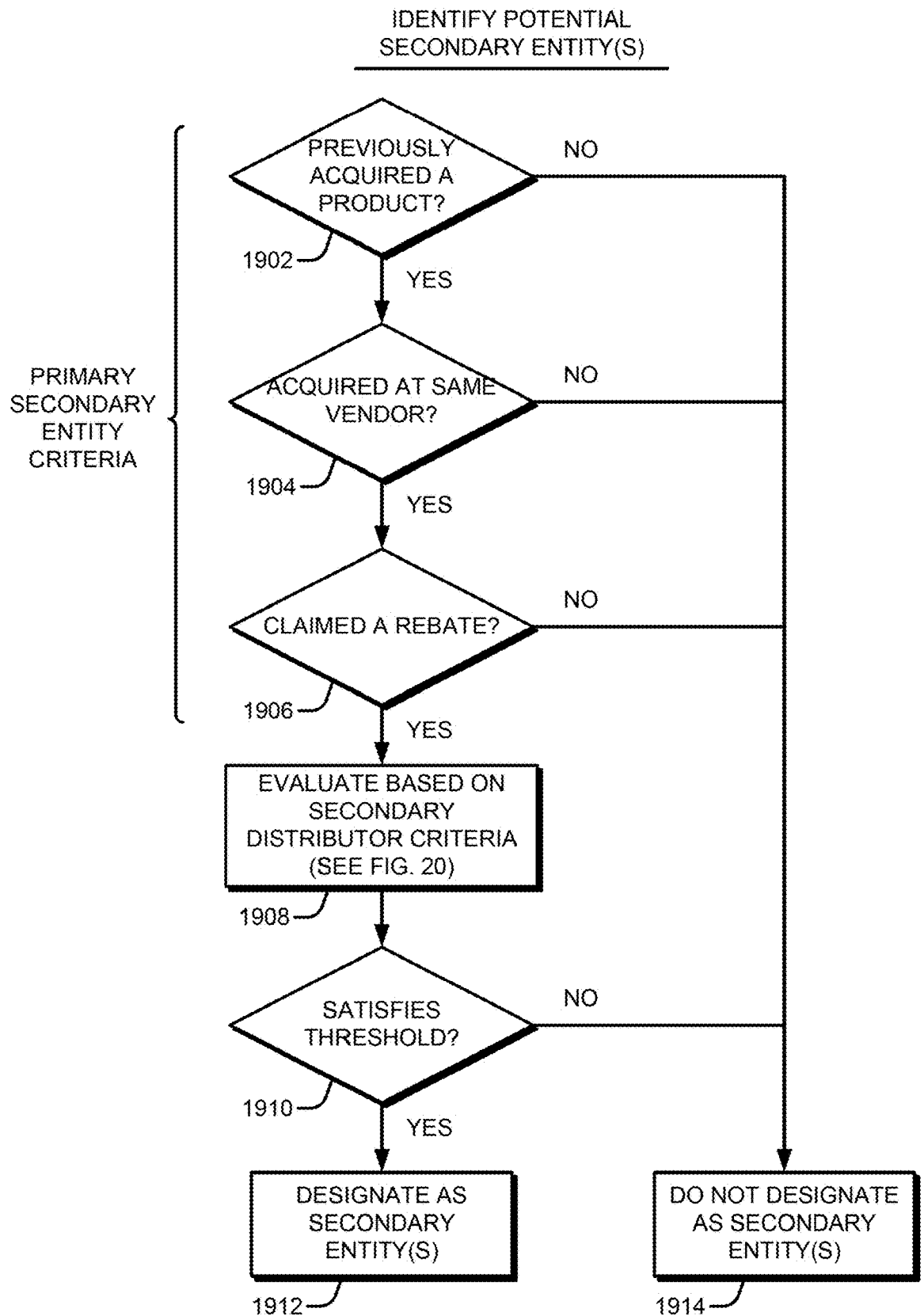
FIG. 19 is a flowchart of a process for designating an acquisition entity as a potential distributor in accordance with some embodiments.

FIG. 19 illustrates a flowchart of a process for designating one or more acquisition entities as potential distributors in accordance with some embodiments. In one embodiment, the method of FIG. 19 may be performed by the workflow management system 101. In other embodiments, another suitably configured computing device may perform some or all blocks of the described method. Depending on the embodiment, the method of FIG. 19 may include fewer or additional blocks and/or the blocks may be performed in order different than is illustrated.

In some embodiments, as an initial matter an acquisition entity must first satisfy a number of primary distributor criteria in order to be considered a potential distributor. For example, in order to be a potential distributor for a particular rebate promotion, the acquisition entity must have previously purchased a product (block 1902) from the same vendor/vendor/vendor associated with the rebate promotion (block 1904). In addition, the acquisition entity may also be required to have participated or be currently participating in a rebate promotion associated with the vendor (block 1906). In the embodiment of FIG. 19, if any of the primary distributor criteria are not satisfied (blocks 1902, 1904, 1906), then the acquisition entity is not designated as potential distributor (block 1914). Such limitations may ensure that the distributors of syndicated information components have appropriate connections to the rebate promotion, providing the credibility enhancements described previously.

It is understood that in some embodiments, different primary distributor criteria or different combinations of primary distributor criteria may be used. For example, in some embodiments, an acquisition entity must have purchased the same product associated with the rebate promotion to be syndicated, a product in a common category as the product associated with the rebate promotion, any product from the same vendor, a product in a same cost range or category, etc. An acquisition entity may be required to have participated in a certain number of prior rebate promotions associated with a vendor in order to be considered a potential distributor for that vendor. In some embodiments, the acquisition entity must have completed the purchase, or purchases, within a predefined time period, such as one month, three months, one year, etc. In some embodiments, individual vendors, vendors, or vendors are able to configure primary distributor criteria that they wish to use in order to satisfy their specific needs.

At block 1908, if the acquisition entity has satisfied all of the primary distributor criteria, the acquisition entity may be evaluated based upon one or more secondary distributor criteria. In some embodiments, the secondary distributor criteria are processed or aggregated (e.g., as a weighted sum) in order to compute an overall score (also referred to as a sharer score). For example, a sharer score calculated as a weighted sum may be calculated using the following formula:

$$\text{sharer score} = \sum_{i=1}^{n} w_i c_i$$

where there are n secondary distributor criteria, with each individual criteria $c_i$ having an associated weight $w_i$.

In some embodiments, how the secondary distributor criteria are used to calculate a sharer scores may be customized based upon the specific needs of the vendor or vendor. For example, a vendor may access a user interface containing a plurality of sliders that can be used to set weights for a number of different secondary distributor criteria, which may then be aggregated as a weighted sum to produce a sharer score. In addition, other types of formulas or calculations may be used when calculating a sharer score based upon the secondary distributor criteria.

FIG. 20 illustrates some of the secondary distributor criteria that may be used in some embodiments. For example, secondary distributor criteria may include click-related data, such as gross clicks associated with shared information components and/or gross click purity. For instance, high gross click purity may indicate that an acquisition entity is more effective at sharing information components. For example, referring to FIG. 18, first acquisition entity 1802 has a relatively high gross click purity (55.56%), and thus may be considered a more desirable candidate for being a potential distributor compared to acquisition entities 1804, 1806, and 1808, who have lower gross click purities. On the other hand, for some vendors, a high gross clicks total may also be considered desirable, even if the gross click purity is low. For example, even though fourth acquisition entity 1808 has low gross click purity, they may still be desirable to use as a distributor due to the high number of gross clicks that they were able to achieve compared to the other acquisition entities. Thus, different distribution programs may have very different secondary distributor criteria and/or different weightings for respective criteria, such as based on the needs of the particular vendor.

In some embodiments, gross clicks may be defined as the total number of clicks on information components shared by the distributor, while gross click purity may be calculated as:

gross click purity=# of legitimate clicks/gross clicks where whether a click is legitimate is determined by a workflow management system or entity using any of the methods or criteria described above (e.g., as illustrated at block 1402 in FIG. 14). In other embodiments, gross clicks and/or gross click purity may be defined or determined in other ways or based upon other data. For example, gross click purity may in some embodiments be based upon a number of clicks having other characteristics in relation to the total number of clicks (e.g., clicks that resulted in the performance of an action, such as signing up for a mailing list or purchase of a product/service, and/or the like).

In some embodiments, click-related data for a particular acquisition entity, such as gross clicks and/or gross click purity, may be calculated based upon all rebate promotions that the acquisition entity has participated in, or may be restricted based upon time period (e.g., only rebate promotions participated in the past three months are considered), vendor (e.g., only rebate promotions participated in that are associated with the same vendor are considered), product (e.g., only rebate promotions participated in that are associated with the same or similar products are considered), and/or the like.

As illustrated in FIG. 20, secondary distributor criteria may also include cost measures, such as a cost per share (or incentive) associated with the acquisition entity, and/or a cost per click (or click value) associated with the acquisition entity. In order to keep down costs, it may be desirable to select potential distributors associated with low costs (while still retaining desirable characteristics such as high gross click purity). Thus, higher cost per share and/or cost per click for an acquisition entity may result in a lower sharer score. For example, if the sharer score is calculated as a weighted sum, cost measure criteria may be assigned a negative weight, or be expressed as an inverse of the cost, such that a higher cost will result in a lower sharer score that is indicative of a less desirable distributor.

In some embodiments, cost per click and/or cost per share can be calculated based upon the past rebate promotions that the acquisition entity has participated in (e.g., all past promotions participated in, or filtered based upon time period, vendor, product, and/or the like). For instance, cost per click may be calculated as a total monetary value paid to the acquisition entity in connection with clicks associated with one or more previous rebate promotions that the acquisition entity has participated in, divided by the number of clicks.

In some embodiments, other information, such as past rebate promotions that were offered to, but turned down by the acquisition entity, may also be considered. For example, if an acquisition entity has consistently agreed to participate in rebate promotions with a click value of $5 or more, but has declined to participate in rebate promotions with click values of less than $4, then a click value that the acquisition entity may be willing to accept can be determined. In some embodiments, the cost measures may be determined based upon one or more inputs from the acquisition entity. For example, after an acquisition entity has signed up for a rebate promotion or has completed a rebate promotion, they may be presented with a user interface asking if they would be willing to be a secondary entity (e.g., a distributor) for additional promotions and/or at what price they would be willing be a distributor (illustrated below in FIG. 22).

The secondary distributor criteria may also include whether the acquisition entity has any existing rebates outstanding. For example, in some embodiments, an acquisition entity who currently has a large amount of outstanding existing rebates may be less desirable for sharing additional information components than an acquisition entity who has no outstanding existing rebates, in order to avoid overloading an audience of a particular acquisition entity with too much promotional content at once. Alternatively, an acquisition entity with a large amount of outstanding existing rebates that were recently accepted for distributorship by the acquisition entity may indicate that the acquisition entity has a high value to other vendors and may potentially be a valuable distributor.

In some embodiments, other criteria, such as purchase conversions, may also be considered. For example, a purchase or order can be associated with a click by tracking an IP address, user agent, and/or API key associated with the click and matching it to a subsequent order that occurs within a specified time period of the click. By doing so, a purchase conversion rate for an acquisition entity (e.g., how many of the clicks associated with the acquisition entity's shared information components resulted in a purchase or sale) can be calculated. Typically, an acquisition entity having a high purchase conversion rate will be more desirable as a potential distributor.

In addition, some vendors or venders may also consider geographic location when selecting potential distributors. In some embodiments, geographic location may be determined using an IP address of the acquisition entity, acquisition entity-entered information (e.g., on a form when making a purchase or signing up for a rebate promotion), geolocation data of a device used by the acquisition entity (e.g., GPS data from a mobile device running a distributor application or website), and/or the like. Based upon the acquisition entity's geographic location, a geographic proximity between the acquisition entity being considered as a potential distributor and the original acquisition entity, the original vendor, and/or other branches of the vendor may be determined. Thus, while a particular acquisition entity may not be in close geographic proximity to the original acquisition entity or even the original vendor from which the product resulting in the rebate was purchased, an acquisition entity may still receive a high contribution to his share score if he lives close to another location of the vendor (possibly hundreds or thousands of miles away from the original acquisition entity). Similar to the other primary and secondary distributor criteria discussed herein, use of any particular criteria and weightings associated with those criteria may be customized by each advertiser and for each rebate promotion.

In some embodiments, various demographic factors may also be considered as secondary distributor criteria. For example, when syndicating a rebate promotion associated with an original acquisition entity to one or more distributors, it may be desirable to use distributors that have similar demographic characteristics to the original acquisition entity.

The illustrated primary and secondary criteria are provided for purpose of example and not limitation. In various embodiments, different criteria, different weightings of criteria, and/or different combinations of criteria may be used. In some embodiments, a particular vendor, vendor, or advertiser may select the secondary distributor criteria that they wish to use for their rebate purchases. In addition, the vendor, vendor, or advertiser may also set weights for the criteria or otherwise designate how the criteria will be used to calculate a sharer score.

In an embodiment, all of the criteria indicated by solid boxes in FIG. 20 may be used as a default for selection of a potential distributor (namely, gross clicks, gross click purity, cost per share, cost per click, and existing rebates outstanding). In another embodiment, the additional criteria indicated by dashed boxes in FIG. 20 may also be used in the selection of a potential distributor. In another embodiment, any subset of the criteria (both in the solid and dashed boxes) may be used in selection of potential distributors. For example, particular vendors may use different combinations of criteria and weightings of such criteria than other vendors.

For example, a particular vendor may, when calculating a sharer score for an acquisition entity, use a weighted sum of gross clicks (weight of 1), gross click purity (weight of 20), cost per share (weight of −1), and cost per click (weight of −10). Thus a first acquisition entity having 20 gross clicks, a gross click purity of 60%, a cost per share of $5, and a cost per click of $0.20 would have a score of 25 (20*1+0.6*20+ 5*(−1)+0.2*(−10)=25). On the other hand, a second acquisition entity having 10 gross clicks, a gross click purity of 90%, a cost per share of $3, and a cost per click of $0.5, would have a score of 20 (10*1+0.9*20+3*(−1)+0.5*(−10) =20). Thus, based on these example sharer score attributes and weightings, the first acquisition entity would be more likely to be chosen as a potential distributor.

In some embodiments, criteria may be further processed or manipulated when calculating a sharer score. For example, a particular vendor may configure a sharer score calculation such that a gross click purity of 50% or above contributes 5 points to an acquisition entity's sharer score, while any gross click purity below 50% contributes no points.

Returning to FIG. 19, once a sharer score for the acquisition entity is calculated, at block 1910 it is determined if the acquisition entity has a sharer score that satisfies a particular threshold. If the threshold is satisfied, then the acquisition entity is designated as a potential distributor for the rebate promotion (block 1912). On the other hand, if the threshold is not satisfied, then the acquisition entity is not designated as a potential distributor (block 1914).

In some embodiments, in addition to identifying potential distributors, an allocation of how the rebate is to be distributed may also be determined. This process may be that previously described with respect to block 1708 of FIG. 17. In some embodiments, the allocation may be determined by processing and/or aggregating one or more allocation factors (e.g., as a weighted sum). FIG. 21 illustrates various factors that may be used in determining an allocation in accordance with some embodiments, which are discussed further below.

One factor that may be used in determining allocation is the click value of the rebate to be distributed. For example, if the click value of the rebate is $5 per click, then the amount that can be allocated to a potential distributor cannot exceed that amount. In addition, a low click value may limit the potential distributors that may be identified, so some distributors may only be willing to share information components if the click value is above a certain value.

In addition, one or more inputs from the vendor, original acquisition entity, and/or potential distributor may be considered when determining an allocation. For example, the original acquisition entity may be given an option to raise the distributor allocation when offered the option to syndicate the promotion to distributors. An original acquisition entity who has not experienced success with his or her own shares may opt to do so in order to potentially increase the number of clicks, by having the information components be distributed by more effective distributors. An input may be received from a potential distributor may indicate a desired click value and/or incentive.

Remaining value of the rebate to be distributed may also be a factor. For instance, the rebate amount that can be allocated to distributors may be limited by remaining value of the rebate to be distributed. In addition, the remaining value of the rebate may also be indicative of an effectiveness of sharing by the original acquisition entity. For example, in some embodiments, if the remaining value of the rebate to be distributed is large, a higher percentage of the rebate may be allocated to the distributor. In addition, in some embodiments, a rebate promotion may only allow rebates for a certain amount of clicks. In these cases, the number of clicks remaining in the rebate promotion may also be a factor when determining an allocation.

Other criteria to be considered may include distributor cost measures (incentive and/or click value), etc. For example, the average incentive and/or click value paid to the potential distributor in past rebate promotions they have participated in may be an important factor in determine how much to allocate to the potential distributor. For example, if it is known that the potential distributor has a certain cost at which they are likely willing to share information components (e.g., through analysis of past rebate promotions that the potential distributor participated in and declined to participate in), the allocation may be set (e.g., increased or decreased from a default allocation) such that it meets (or is close to) that cost, if such adjustment is in accordance with other allocation criteria.

In some embodiments, a fee to be paid to the workflow management system may also be considered when determining an allocation. The workflow management system may collect a fee for each click on information components shared by an acquisition entity (e.g., a percentage of the click value). In some embodiments, when a rebate promotion is syndicated, the workflow management system may collect an additional fee (e.g., a flat fee, or an additional percentage of the click value). In other embodiments, the fee may remain unchanged when a rebate promotion is syndicated to distributors. How the workflow management system collects a fee may be different depending on the particular vendor.

In some embodiments, a rebate promotion may be syndicated using multiple potential distributors. In some embodiments, the click value of the rebate promotion may be allocated between the original acquisition entities and the multiple distributors (e.g., the original acquisition entity receives 40% after fees, while three distributors each get 20%). In some embodiments, different selected distributors may be allocated differing portions of the rebate promotion based on one or more of the allocation criteria described above. For example, a distributor determined to be more valuable (for example, a distributor having a higher gross click purity, a higher total number of gross clicks, and/or a higher average click value) may be provided with a larger click value for the particular syndicated rebate than another distributor determined to be less valuable. In other embodiments, each distributor may be assigned a portion of the remaining available clicks. For example, if a rebate promotion is associated with 100 remaining clicks, multiple distributors may be selected, each being assigned a portion of the remaining clicks (e.g., 4 distributors with 25 clicks each). Alternatively, each distributor may accumulate clicks, up until a total remaining amount (e.g., 100 clicks) is collectively reached. Although the above examples show each of the multiple distributors receiving the same allocation or the same number of clicks, in some embodiments, each distributor may have a different allocation or a different number of clicks.

Once the allocation has been determined, the potential distributor(s) are notified (e.g., through a web page, pop-up, email message, and/or the like) of the rebate promotion and/or the allocation associated with the rebate promotion. The potential distributor may then be given an option to agree to distribute of the information components associated with the rebate promotion. In some embodiments, a potential distributor may be automatically deemed to have agreed to distribute the information components, based upon one or more preference selections by the potential distributor (e.g., a potential distributor may set a preference to automatically accept information components if the click value is above a certain value).

In some embodiments, the above factors are processed or aggregated in order to compute an allocation. For example, an allocation amount may be calculated as follows:

$$\text{allocation} = \sum_{i=1}^{n} w_i f_i \times \text{click value}$$

where there are n allocation factors, with each individual criteria $f_i$ having an associated weight $w_i$. The aggregated factors ($\sum_{i=1}^{n} w_i c_i$) may be calculated as a percentage value that is then multiplied by the click value of the rebate to be distributed in order to obtain an allocation value for a distributor. In other embodiments, allocation may be calculated in other manners.

Figure 22:
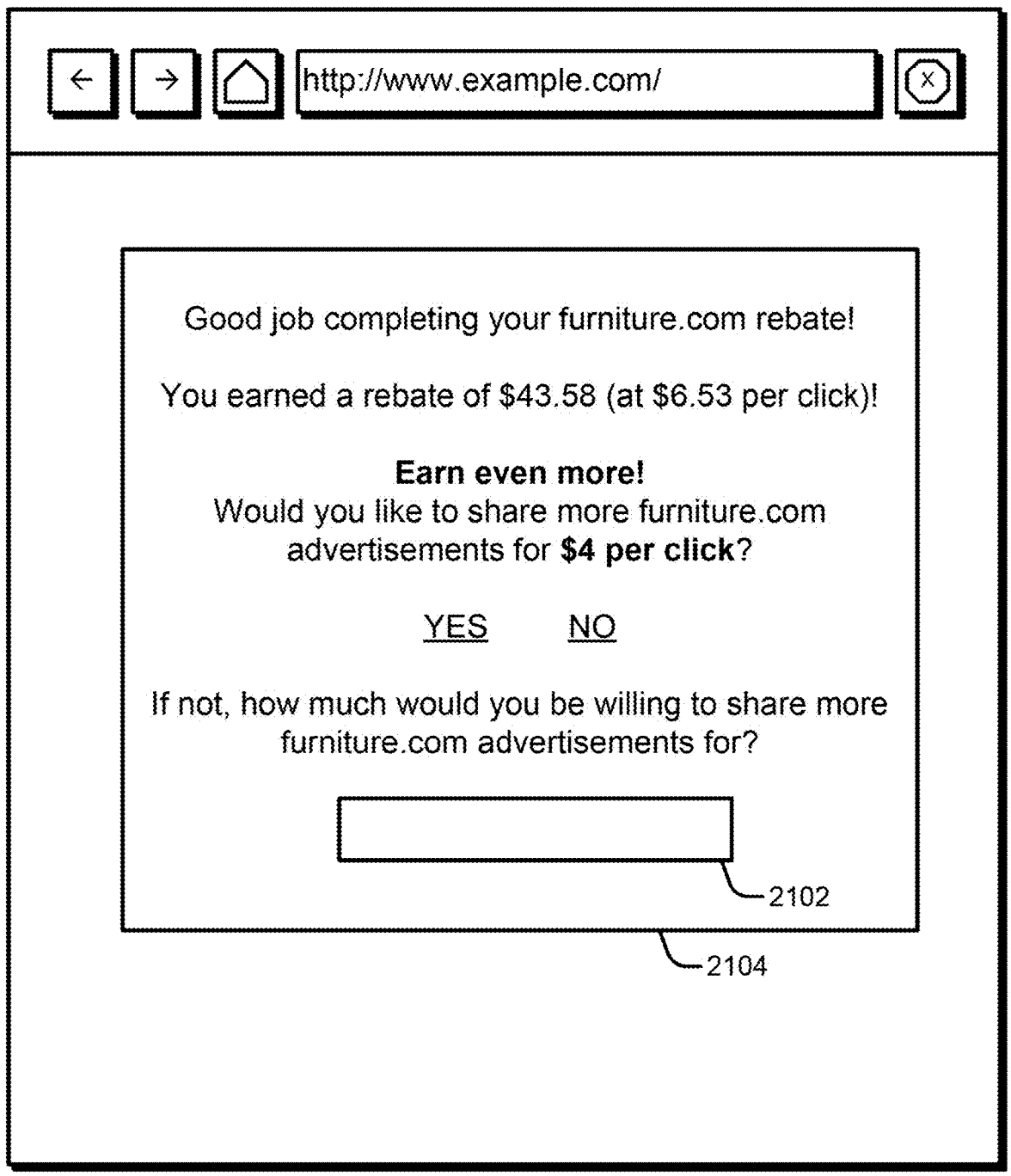
FIG. 22 is a user interface in which acquisition entity is given an option to sign up as a potential distributor, in accordance with some embodiments.

FIG. 22 illustrates a user interface in which an acquisition entity is given an option to sign up as a potential distributor, in accordance with some embodiments. In some embodiments, after an acquisition entity has completed a rebate promotion (e.g., through the expiration of a rebate time period, the acquisition entity reaching the maximum rebate value, and/or the like), they may be prompted with a message 2104. Message 2104 may be in the form of a web page, pop-up, instant message, email, and/or the like. In some embodiments, message 2104 contains a summary of the rebate that the acquisition entity has completed, as well as an offer to participate in future rebate promotions at an offered click value. The offered click value may be a default value or a value based on factors discuss above with reference to FIG. 21, such as, for example, the acquisition entity's past rebate promotion participation, a value based upon those accepted by distributors that are similar to the acquisition entity, and/or the like. If the acquisition entity considers the offered click value to be too low, they may be prompted to input a click value that will be acceptable to them (e.g., using text field 2102).

In some embodiments, an offer to participate in future rebate promotions as a distributor is only given to acquisition entities that meet certain criteria (e.g., have made a purchase above a certain amount, have achieved a threshold gross click amount, have achieved a threshold gross click purity, and/or the like) as described above in reference to FIG. 19.

While FIG. 22 illustrates message 2104 as being presented to the acquisition entity upon completion of a rebate promotion, in other embodiments, messages offering an acquisition entity to participate in future rebate promotions may be presented to the user at different times (e.g., while a current rebate promotion is still active, some time after they have completed the rebate promotion, and/or the like). For example, such a syndication offer may be provided to the acquisition entities when there are extra clicks for the acquisition entities to share as a distributor. Thus, the acquisition entity may periodically receive such offers as opportunities to be a distributor arise.

Figure 23:
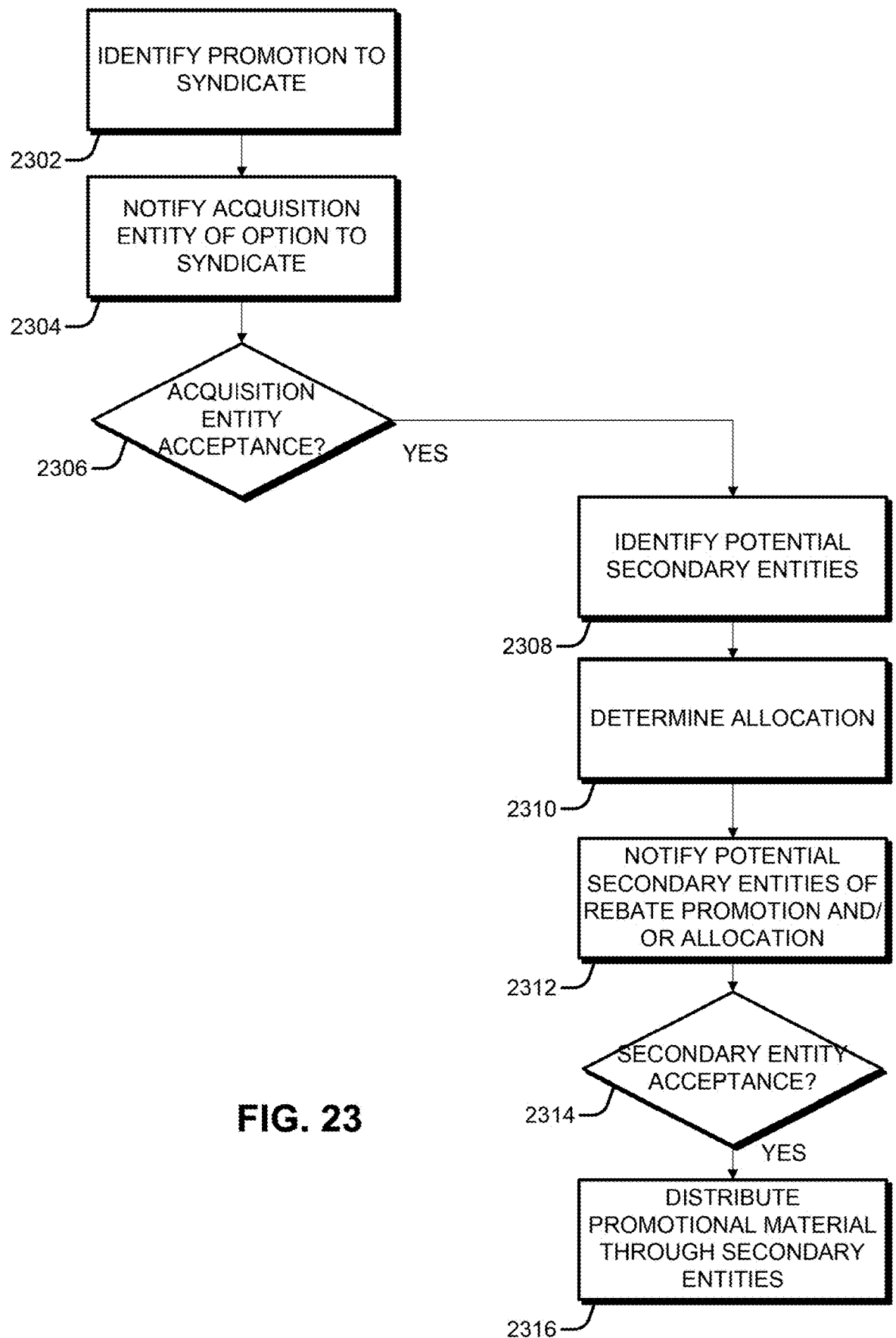
FIG. 23 is a flowchart of a process for syndicating a rebate promotion with one or more potential distributors, in accordance with some embodiments.

FIG. 23 illustrates a flowchart of a process for syndicating a rebate promotion with one or more potential distributors, in accordance with some embodiments. In one embodiment, the method of FIG. 23 may be performed by the workflow management system 101. In other embodiments, another suitably configured computing device may perform some or all blocks of the described method. Depending on the embodiment, the method of FIG. 23 may include fewer or additional blocks and/or the blocks may be performed in order different than is illustrated.

At block 2302, a rebate promotion is identified as a candidate for syndication. In some embodiments, every rebate promotion is initially identified for possible syndication. In some embodiments, rebate promotions that are currently in progress may also be candidates for syndication. For example, if it is determined that a rebate probation being shared by the original acquisition entity is not reaching a desired effectiveness (e.g., if a certain period of time has passed since the original acquisition entity has shared the information components, but a threshold number of clicks has not yet been reached), the rebate promotion may be identified as a candidate for syndication. In some embodiments, the acquisition entity may request that a rebate promotion is syndicated at any time, such as even immediately after the purchase is completed and the rebate promotion is provided to the acquisition entity. For example, some acquisition entities may prefer to receive a lower rebate amount (e.g., paying a portion of each click value to a distributor), rather than posting the information components and obtaining clicks himself.

At block 2304, the original acquisition entity associated with the rebate promotion is notified of the option to syndicate at least a portion of the rebate to one or more distributors. (e.g., as illustrated at 1004 in FIG. 10). In some embodiments, this option is presented to the original acquisition entity when the original acquisition entity is presented with the rebate promotion. In addition or in the alternative, this option may be presented to the original acquisition entity after the rebate promotion has already been accepted. For example, if a certain period of time has passed since the original acquisition entity shared the information components associated with the rebate promotion, but a threshold number of clicks has not yet been reached, the original acquisition entity may be automatically presented with a message indicating the option to syndicate at least a portion of the remaining clicks to one or more distributors.

At block 2306, the system determines whether the original acquisition entity has accepted the option to syndicate the rebate promotion to distributors. If no acceptance is received, the process ends. In some embodiments, instead of notifying and receiving acceptance from the original acquisition entity, the original acquisition entity may be deemed to have accepted syndication to distributors based at least in part upon one or more settings or preferences. Thus, in such an embodiment the original acquisition entity may not have an option to decline distributors of the rebate promotion and notice of syndication of the rebate promotion may not be provided to the original acquisition entity at all, or may be provided simply as a notice to the original acquisition entity that the rebate promotion is being syndicated without an option for the original acquisition entity to decline the syndication activities.

At block 2308, one or more potential distributors are identified (e.g., using the process illustrated in FIG. 19). At block 2310, an allocation is determined (e.g., using one or more of the factors illustrated in FIG. 21).

At block 2312, the identified distributors are notified of the rebate promotion and/or the determined allocation.

At block 2314, the system determines whether any of the identified distributors have accepted the rebate promotion and the proposed allocation (which may be different for each potential distributor, as discussed above). If so, then at block 2316, information components for the rebate promotion are distributed and shared through the distributors. Else, if the identified distributors do not accept the rebate promotion, the process ends without the rebate promotion being syndicated through the distributors. In some embodiments, the process may return to block 2308 to identify another set of one or more potential distributors, at which point criteria for selection of distributors may be adjusted, and/or an allocation may be adjusted, to increase a likelihood that newly selected potential distributors will accept the promotion.

In some embodiments, potential distributors may also be offered rebate promotions that are not directly associated with a rebate promotion of an original acquisition entity. For example, a vendor or vendor may allocate a budget for rebates. However, not all of the rebates will be claimed (e.g., due to acquisition entities or distributors not being able to achieve a certain number of clicks prior to an expiration of a promotion time period, not enough acquisition entities participating in the rebate promotion, or failure to sell enough products that qualify for the rebate in order to reach the allocated rebate budget). As a result, it may be found that a portion of the budget for rebates is not distributed. For example, a vendor may have designated a daily budget of $1000 for rebate promotions. However, at the end of the day, it may be found that only $800 in rebates have been claimed, leaving $200 left over.

In some cases, a vendor may wish to reclaim the leftover budget. However, in other cases, it may be desirable to use the leftover budget to syndicate additional information components to distributors in order to generate additional clicks and purchases. In some embodiments, the leftover budget is used to create one or more new rebate promotions to be offered to potential distributors. Creation and distribution of the new rebate promotions may occur periodically (e.g., at the end of each month), on an as-needed basis (e.g., whenever the amount of unclaimed rebates reaches a threshold value), or some combination thereof.

The information components associated with the newly created rebate promotions may be the same information components used in previous rebate promotions, or may comprise different information components. Incentives and/or click values of the rebate promotions may be determined based upon a monetary value of the leftover budget, any of the factors illustrated in FIG. 21, and/or the like.

After new rebate promotions are created, potential distributors may be identified (e.g., similar to block 2308 in FIG. 23). The process may then proceed in a manner similar to that illustrated in FIG. 23.

Figure 24:
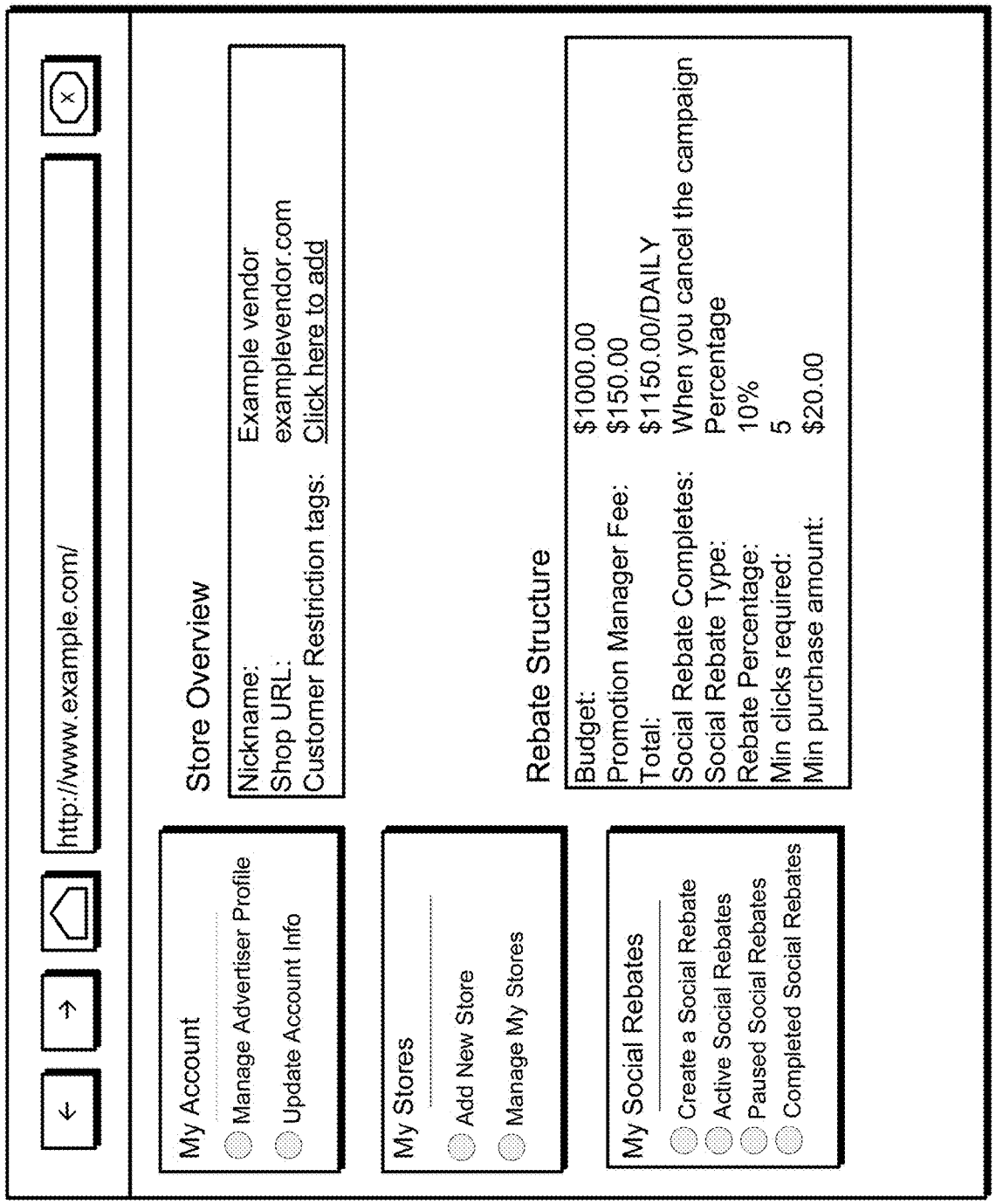
FIG. 24 is a user interface for allowing a vendor to configure rebate promotions at a workflow management system, in accordance with some embodiments.
Figure 25:
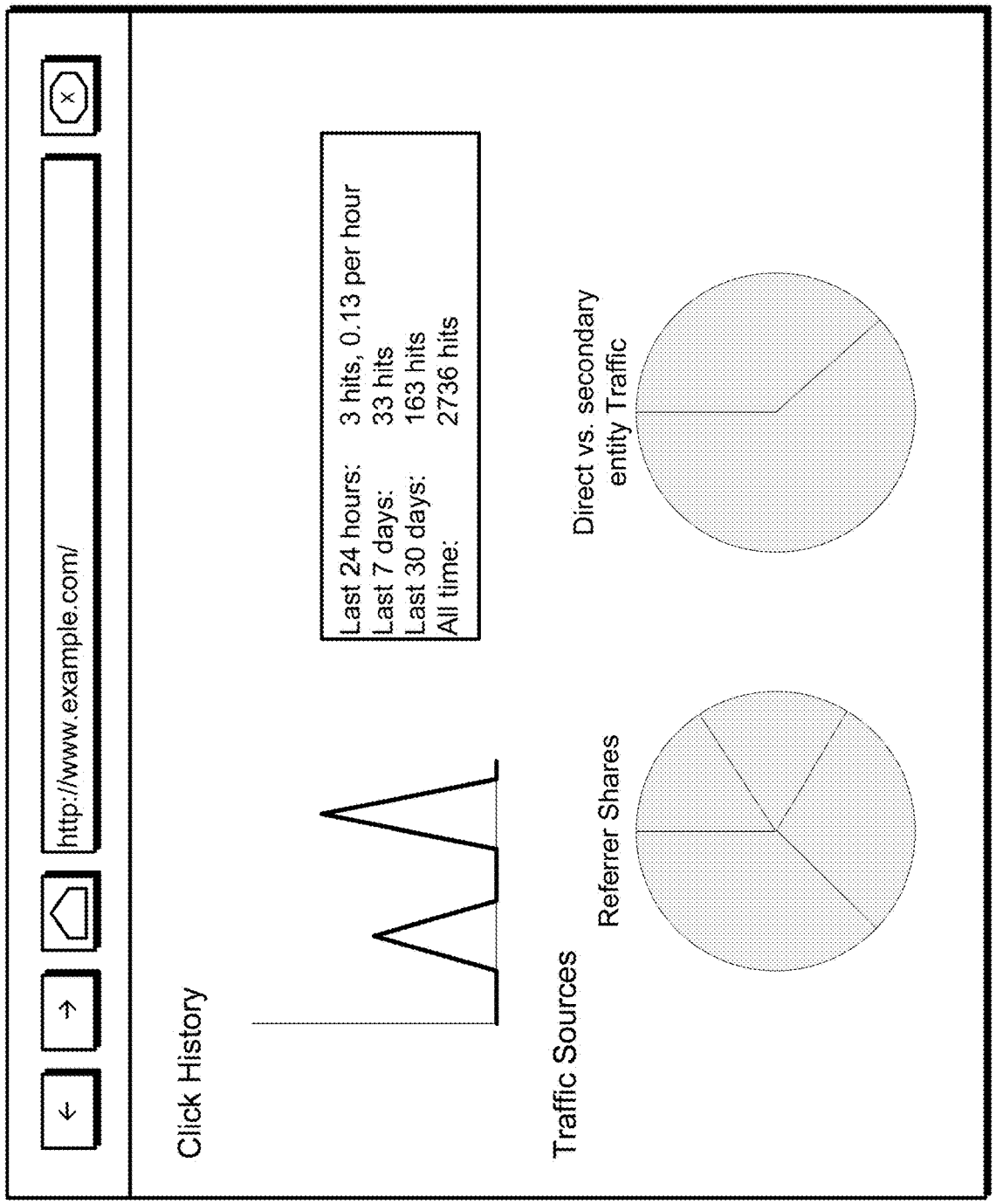
FIG. 25 is a user interface for displaying rebate data in accordance with some embodiments.

FIG. 24 illustrates an example user interface for allowing a vendor to configure rebate promotions at a workflow management system, in accordance with some embodiments. In one embodiment, the example user interfaces of FIGS. 24-26 are generated by the workflow management system 101, and provided to vendors (or other advertisers) via the network 102 (FIG. 1). Using the user interface of FIG. 24, a user (e.g., an administrator or other personnel associated with a vendor or vendor) may create an account with the workflow management system. Once an account is created, the user may associate one or more vendors with the account. In addition, one or more rebate structures may be specified. For example, the user may specify a monetary budget to be used for rebates or for a type of rebate. Rebate parameters, such as the type of rebate (e.g., percentage of purchase price or specific monetary value), duration of rebate campaign, minimum number of clicks and/or purchase to receive the rebate, rebate percentage, rebate duration, and/or the like may also be specified and displayed. Thus, each of the attributes in the Rebate Structure section of the example user interface in FIG. 24 may be provided by the advertiser, perhaps based on default values that are selected by the workflow management system based on average values for other similar advertisers, for example.

In some embodiments, a fee collected by a workflow management system may also be displayed. The fee may be a flat amount and/or a percentage of the monetary budget of the vendor. For example, if a budget of $1000 per day is allocated by a vendor for use in rebate promotions, the workflow management system may be paid a percentage of that amount (e.g., 15%). In some embodiments, payment to the workflow management system is processed on a per click basis. Thus, if not all of the budget for rebate promotions is claimed, the workflow management system may only be paid based upon the actually claimed rebate value. In some embodiments, the workflow management system may receive an additional payment when a rebate promotion is syndicated to a distributor (a flat fee or a per click fee), while in other embodiments payment is the same regardless of whether the rebate is achieved through an original acquisition entity or a syndicated distributor.

FIG. 25 illustrates an example user interface for displaying rebate data in accordance with some embodiments. In the illustrated interface, one or more charts, tables, graphs, and/or the like may be used to provide data on the clicks that have been received in connection with shared information components associated with a rebate promotion. For example, a chart or graph (e.g., a line graph) may be used to display how many clicks to shared information components associated with a rebate promotion were received over time. In addition, a table may be displayed that lists how many clicks were received over different time periods. In some embodiments, filters or controls may be included that allow a user to refine the data that is displayed. For example, a user may wish to view clicks received over a specific social network, clicks associated with material shared by certain acquisition entities, and/or the like.

The interface may also display one or more charts, tables, or graphs illustrating the source of the received clicks. For example, different acquisition entities may choose to share information components through different referral channels (e.g., different social networks, different blogs, etc.). In addition, the clicks may have been for information components shared by the original acquisition entity, or shared by distributors. A first chart or graph may be displayed that breaks down the distribution of clicks between different referrers. In addition, a second chart or graph may display how clicks have been distributed between direct shares (e.g., shares by the original acquisition entity) and distributor shares (e.g., shares by syndicated distributors).

FIG. 26 illustrates an example user interface for displaying rebate data in accordance with some embodiments. In the illustrated interface, the Rebate Data Analytics illustrates data such as a number of rebates claimed, total monetary value committed (e.g., total value of the rebates if they were claimed in full), and total monetary value earned (e.g., total value earned by all acquisition entities participating in the rebate promotion thus far). In addition, a table may be used to display data for individual acquisition entities that are participating in the rebate promotion.

Additional Embodiments

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and tasks described herein may be performed and fully automated by a computer system. The computer system may, in some cases, include multiple distinct computers or computing devices (for example, physical servers, workstations, storage arrays, and so forth) that electronically communicate and interoperate over a network to perform the described functions. Each such computing device typically includes a processor (or multiple processors) that executes program instructions or modules stored in a memory or other computer-readable storage medium. Where the system includes multiple computing devices, these devices may, but need not, be co-located. The results of the disclosed methods and tasks may be persistently stored by transforming physical storage devices, such as solid state memory chips and/or magnetic disks, into a different state.

All of the methods and processes described above may be embodied in, and fully automated via, software code modules executed by one or more general purpose computers. The code modules may be stored in any type of computer-readable medium or other computer storage device. Some or all of the methods may alternatively be embodied in specialized computer hardware. The results of the disclosed methods be stored in any type of computer data repository, such as relational databases and flat file systems that use magnetic disk storage and/or solid state RAM.

Many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A method comprising:
   receiving, from a vendor, a security key including a unique identifier of the vendor and purchase data indicating purchase of a product by an acquisition entity via a vendor website, the purchase data indicating an amount paid by the acquisition entity for the product;
   automatically calculating, by one or more computer processors, a partial rebate for each of a predetermined quantity of partial rebates associated with interactions with information components associated with the product;
   providing the acquisition entity with access to first information components including an acquisition entity identifier;
   identifying a plurality of potential distributors based on social media information associated with the potential distributors including one or more of:

a raw number of clicks on information components posted by the potential distributor;

a portion of the raw number of clicks that are classified as legitimate clicks, wherein classification of clicks as legitimate is based at least on an IP address of the viewer computing device where the click was made; and a click purity indicating a ratio of the legitimate clicks to the raw number of clicks;

ranking the potential secondary entities based at least on the click purities;

automatically transmitting electronic invitations to the identified plurality of potential distributors;

automatically receiving an indication of acceptance of the electronic invitation from a first of the potential distributors, whereby a first potential distributor becomes a distributor;

linking, by the one or more computer processors, promotion data associating the security key, the acquisition entity identifier, and a distributor identifier;

providing the distributor with distributor information components including the distributor identifier that uniquely identifies the distributor;

in response to receiving an indication that a viewer has interacted with information components associated with URL query parameters, determining whether the predetermined quantity of partial rebates has been reached;

if the predetermined quantity of partial rebates has been reached, not awarding a partial rebate to the acquisition entity or to the distributor; or if the predetermined quantity of partial rebates has not been reached,
  analyzing, by the one or more computer processors, the URL query parameters included in the interacted information components to determine that a) the interacted information components include the acquisition entity identifier or the interacted information components include the distributor identifier; and in response to determining that the URL query parameters include the acquisition entity identifier, automatically crediting an account of the acquisition entity the partial rebate; or in response to determining that the URL query parameters include the distributor identifier, automatically crediting the account of the acquisition entity a first portion of the partial rebate, and automatically crediting an account of the distributor a second portion of the partial rebate.

2. The method of claim 1, wherein allocation of the partial rebate between the acquisition entity and the distributor varies for certain interactions associated with a rebate promotion.

3. The method of claim 1, wherein a maximum rebate provided to the acquisition entity in response to the acquisition entity alone providing the first information components that are interacted with by viewers is less than the maximum rebate when allocated between the acquisition entity and the distributor.

4. The method of claim 1, wherein the potential distributors are further selected based on one or more of demographic characteristics or associations with the purchased product.

5. A computing system comprising:
a hardware computer processor;
a non-transitory computer readable medium having software instructions stored thereon, the software instructions executable by the hardware computer processor to cause the computing system to perform operations comprising:

receiving, from a vendor, a security key including a unique identifier of the vendor and purchase data indicating purchase of a product by an acquisition entity via a vendor website, the purchase data indicating an amount paid by the acquisition entity for the product;

automatically calculating, by one or more computer processors, a partial rebate for each of a predetermined quantity of partial rebates associated with interactions with information components associated with the product;

providing the acquisition entity with access to first information components including an acquisition entity identifier;

identifying a plurality of potential distributors based on social media information associated with the potential distributors including one or more of:
  a raw number of clicks on information components posted by the potential distributor;
  a portion of the raw number of clicks that are classified as legitimate clicks, wherein classification of clicks as legitimate is based at least on an IP address of the viewer computing device where the click was made; and
  a click purity indicating a ratio of the legitimate clicks to the raw number of clicks;

ranking the potential secondary entities based at least on the click purities;

automatically transmitting electronic invitations to the identified plurality of potential distributors;

automatically receiving an indication of acceptance of the electronic invitation from a first of the potential distributors, whereby a first potential distributor becomes a distributor;

linking, by the one or more computer processors, promotion data associating the security key, the acquisition entity identifier, and a distributor identifier;

providing the distributor with distributor information components including the distributor identifier that uniquely identifies the distributor;

in response to receiving an indication that a viewer has interacted with information components associated with URL query parameters, determining whether the predetermined quantity of partial rebates has been reached;

if the predetermined quantity of partial rebates has been reached, not awarding a partial rebate to the acquisition entity or to the distributor; or if the predetermined quantity of partial rebates has not been reached,
  analyzing, by the one or more computer processors, the URL query parameters included in the interacted information components to determine that a) the interacted information components include the acquisition entity identifier or b) the interacted information components include the distributor identifier; and in response to determining that the URL query parameters include the acquisition entity identifier, automatically crediting an account of the acquisition entity the partial rebate; or in response to determining that the URL query parameters include the distributor identifier, automatically crediting the account of the acquisition entity a first portion of the partial rebate, and automatically crediting an account of the distributor a second portion of the partial rebate.

6. The computing system of claim 5, wherein a maximum rebate provided to the acquisition entity in response to the acquisition entity alone providing the first information components that are interacted with by viewers is less than the maximum rebate when allocated between the acquisition entity and the distributor.

7. The computing system of claim 5, wherein the potential distributors are further selected based on one or more of demographic characteristics or associations with the purchased product.

\* \* \* \* \*